(12) United States Patent
Digonnet et al.

(10) Patent No.: US 10,495,508 B2
(45) Date of Patent: Dec. 3, 2019

(54) PHASE-FRONT-MODULATION SENSOR

(71) Applicant: The Board of Trustees of the Leland Stanford Junior University, Palo Alto, CA (US)

(72) Inventors: Michel J. F. Digonnet, Palo Alto, CA (US); Onur Kilic, Mountain View, CA (US); Wonuk Jo, Palo Alto, CA (US); Olav Solgaard, Stanford, CA (US); Behrad Habib Afshar, Stanford, CA (US)

(73) Assignee: THE BOARD OF TRUSTEES OF THE LELAND STANFORD JUNIOR UNIVERSITY, Palo Alto, CA (US)

( * ) Notice: Subject to any disclaimer, the term of this patent is extended or adjusted under 35 U.S.C. 154(b) by 0 days.

(21) Appl. No.: 16/140,380

(22) Filed: Sep. 24, 2018

(65) Prior Publication Data
US 2019/0094066 A1 Mar. 28, 2019

Related U.S. Application Data

(63) Continuation of application No. 15/048,804, filed on Feb. 19, 2016, now abandoned.

(60) Provisional application No. 62/119,647, filed on Feb. 23, 2015.

(51) Int. Cl.
*G01H 9/00* (2006.01)
*G01B 9/02* (2006.01)
*G02B 6/32* (2006.01)

(52) U.S. Cl.
CPC .......... *G01H 9/004* (2013.01); *G01B 9/0201* (2013.01); *G01H 9/006* (2013.01); *G02B 6/32* (2013.01); *G01H 9/00* (2013.01)

(58) Field of Classification Search
CPC ...... G01H 9/004; G01H 9/006; G01B 9/0201; G02B 6/32
USPC .......................................................... 73/655
See application file for complete search history.

(56) References Cited

U.S. PATENT DOCUMENTS

| | | | |
|---|---|---|---|
| 4,558,950 A | * | 12/1985 | Ulrich ...................... G01B 9/02 356/480 |
| 4,668,093 A | | 5/1987 | Cahill |
| 4,705,354 A | | 11/1987 | Ulrich |
| | | | (Continued) |

OTHER PUBLICATIONS

European Extended Search Report re EPO Application No. 16156858.9, dated Jul. 7, 2016.

(Continued)

*Primary Examiner* — Tarun Sinha
(74) *Attorney, Agent, or Firm* — Knobbe, Martens, Olson & Bear

(57) ABSTRACT

A sensor is provided. The sensor includes at least one optical waveguide and an optical reflector. The optical reflector is optically coupled to the at least one optical waveguide and includes a first portion and a second portion. The first portion is configured to reflect a first portion of light back to the at least one optical waveguide. The second portion is configured to reflect a second portion of light back to the at least one optical waveguide. The reflected second portion of the light differs in phase from the reflected first portion of the light by a phase difference that is not substantially equal to an integer multiple of $\pi$ when the second portion of the optical reflector is in an equilibrium position in absence of the perturbation.

21 Claims, 18 Drawing Sheets

(56) References Cited

U.S. PATENT DOCUMENTS

| | | | |
|---|---|---|---|
| 6,574,396 B1* | 6/2003 | Dragone | G02B 6/12011 385/24 |
| 2003/0165291 A1* | 9/2003 | Bhagavatula | G02B 6/2552 385/33 |
| 2010/0199773 A1* | 8/2010 | Zhou | G01H 9/004 73/655 |
| 2010/0242628 A1 | 9/2010 | Knobloch et al. | |
| 2015/0308864 A1* | 10/2015 | Paulsson | G01V 1/48 73/152.16 |

OTHER PUBLICATIONS

Akkaya, O. C., et al., "Modeling and Demonstration of Thermally Stable High-Sensitivity Reproducible Acoustic Sensors," Journal of Microelectromechanical Systems, vol. 21, No. 6, Dec. 2012, pp. 1347-1356.

Beard, P.C., et al., "Optical fiber photoacoustic-photothermal probe," Optics Letters, vol. 23, No. 15, Aug. 1, 1998, pp. 1235-1237.

Brüel & Kjær, "Type 4179," www.bksv.com/Products/transducers/acoustic/microphones/microphone-cartridges/4179, downloaded from the internet on Apr. 26, 2016.

Bucaro, J.A., et al., "Miniature, high performance, low-cost fiber optic microphone," The Journal of the Acoustical Society of America, vol. 118, No. 3, Sep. 2005, pp. 1406-1413.

Chen, L.H., et al., "High performance chitosan diaphragm-based fiber-optic acoustic sensor," Sensors and Actuators A: Physical, vol. 163, No. 1, Jun. 30, 2010, pp. 42-47.

Gagliardi, G., et al., "Design and test of a laser-based optical-fiber Bragg-grating accelerometer for seismic applications," Measurement Science and Technology, vol. 19, No. 8, Jul. 21, 2008, 8 pgs.

Gander, M.J., et al., "Embedded Micromachined Fiber Optic Fabry-Perot Pressure Sensors in Aerodynamics Applications," Sensors Journal, IEEE, vol. 1, No. , 2003, pp. 1707-1712.

Hemenway, B. R., et al. "All-silicon integrated optical modulator for 1.3 μm fiber-optic interconnects," Applied Physics Letters vol. 55, No. 4, Jul. 24, 1989, pp. 349-350.

Hill, David and Phillip Nash, "Fiber-Optic Hydrophone Array for Acoustic Surveillance in the Littoral," International Society for Optics and Photonics, vol. 5780, 2005, pp. 1-10.

Jo, W., et al., "Miniature fiber acoustic sensors using a photonic-crystal membrane," Optical Fiber Technology, vol. 19, No. 6, Aug. 28, 2013, pp. 785-792.

Jo, Wonuk and Michel J. F. Digonnet, "Piconewton force measurement using a nanometric photonic crystal diaphragm," Optics Letters, vol. 39, No. 15, Aug. 1, 2014, pp. 4533-4536.

Kilic, O., et al., "Miniature photonic-crystal hydrophone optimized for ocean acoustics," The Journal of the Acoustical Society of America, vol. 129, No. 4, 2011, pp. 1837-1850.

Lima, S.E.U., et al., "Intrinsic and extrinsic fiber Fabry-Perot sensors for acoustic detection in liquids," Microwave and Optical Technology Letters, vol. 52, No. 5, May 2010, pp. 1129-1134.

Majumder, M., et al., "Fibre Bragg gratings in structural health monitoring—Present status and applications," Sensors and Actuators A: Physical, vol. 147, 2008, pp. 150-164.

NessAiver, M. S., et al., "Recording High Quality Speech During Tagged Cine-MRI Studies Using a Fiber Optic Microphone," Journal of Magnetic Resonance Imaging, vol. 23, No. 783, 2006, pp. 92-97.

Rugar,D., et al., "Improved fiber-optic interferometer for atomic force microscopy," Applied Physics Letters, vol. 55, No. 25, Dec. 18, 1989 pp. 2588-2590.

Teledyne Reason, "TC4032," http://www.teledyne-reson.com/hydrophones/tc-4032/, 2005.

Timoshenko S. P. and Woinowsky-Krieger, S., Theory of Plates and Shells, McGraw-Hill, 1959.

W. Wang, et al., "Miniature all-silica optical fiber pressure sensor with an ultrathin uniform diaphragm.," Optics Express, vol. 18, No. 9, Apr. 26, 2010, pp. 9006-9014.

Wang, Xu-Dong and Wolfbeis, O. S., "Fiber-optic chemical sensors and biosensors (2008-2012)," Analytical chemistry, vol. 85, No. 2, Nov. 9, 2012, pp. 487-508.

Wonuk, Jo et al., "Highly Sensitive Phase-Front-Modulation Fiber Acoustic Sensor," Journal of Lightwave Technology, vol. 22, No. 20, Oct. 15, 2015, pp. 4377-4383.

Xu, Feng, et al., "Fiber-optic acoustic pressure sensor based on large-area nanolayer silver diaphragm," Optics Letter, vol. 39, No. 10, May 15, 2014, pp. 2838-2840.

* cited by examiner

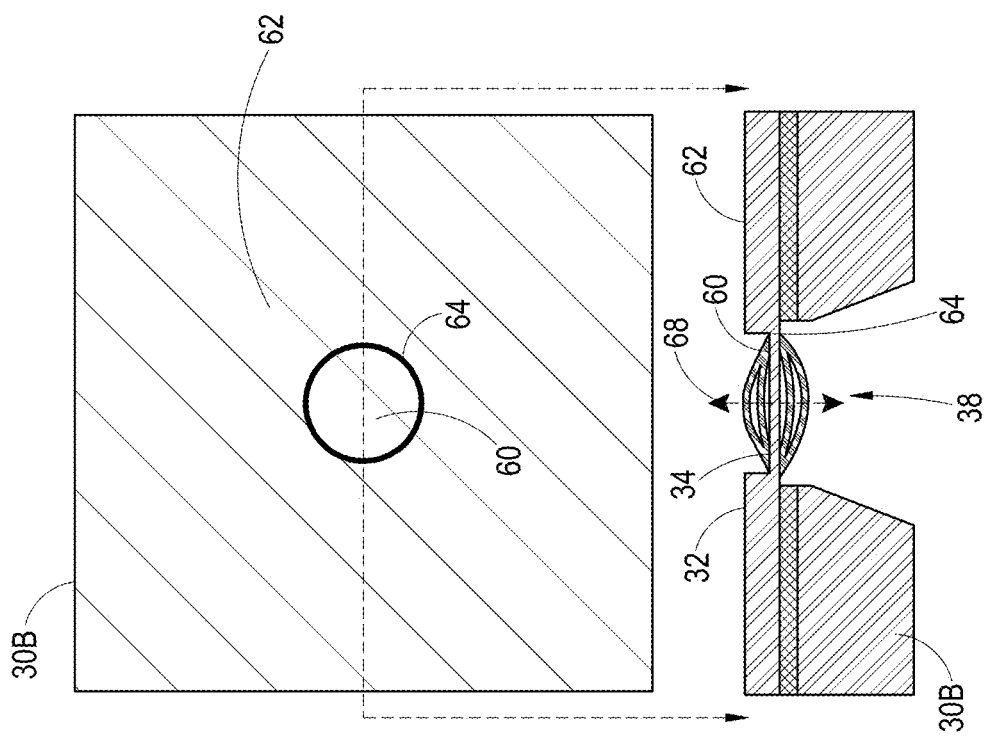
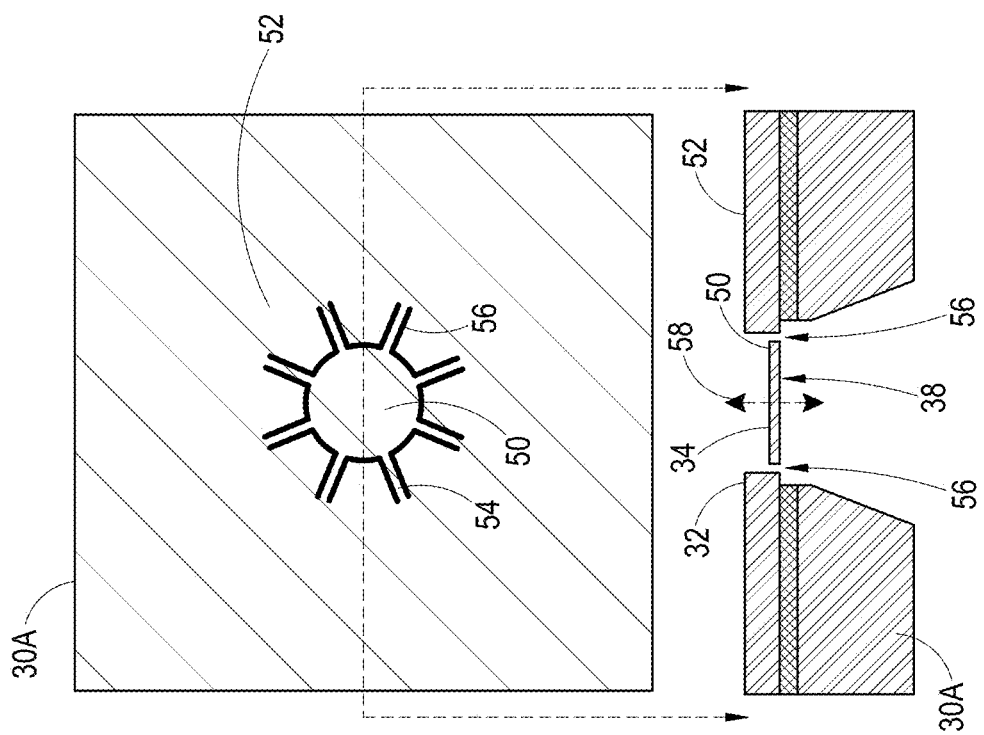

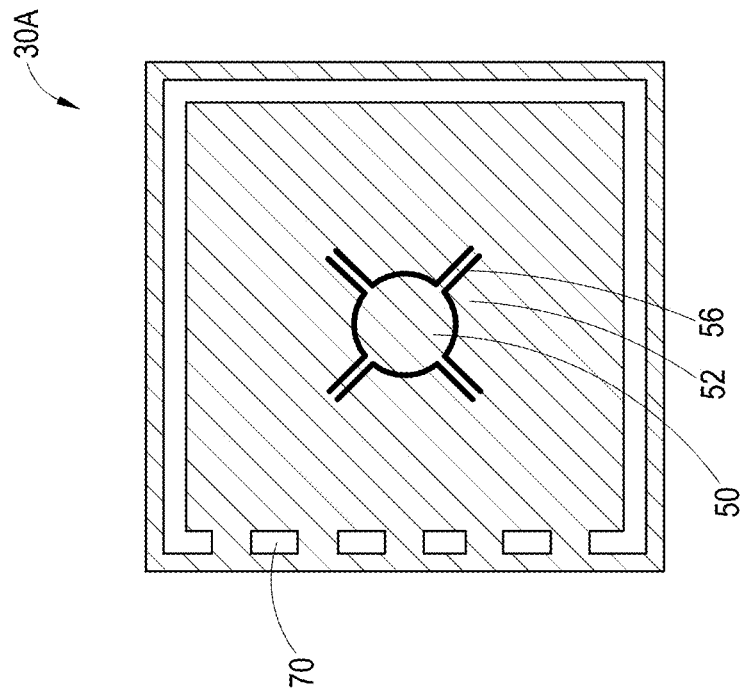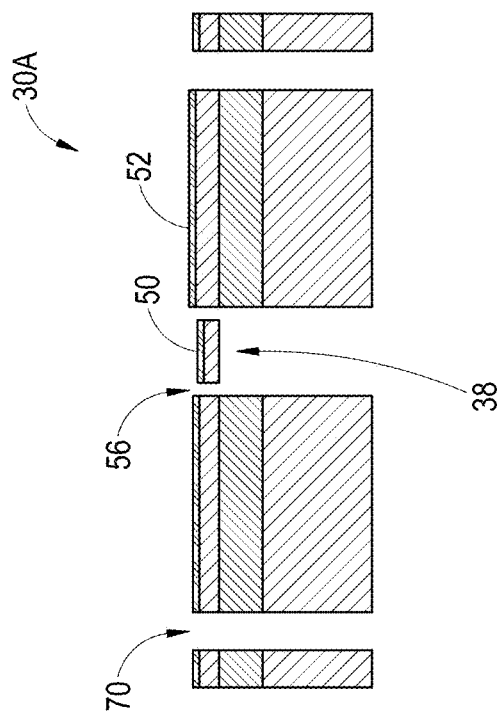
FIG. 4

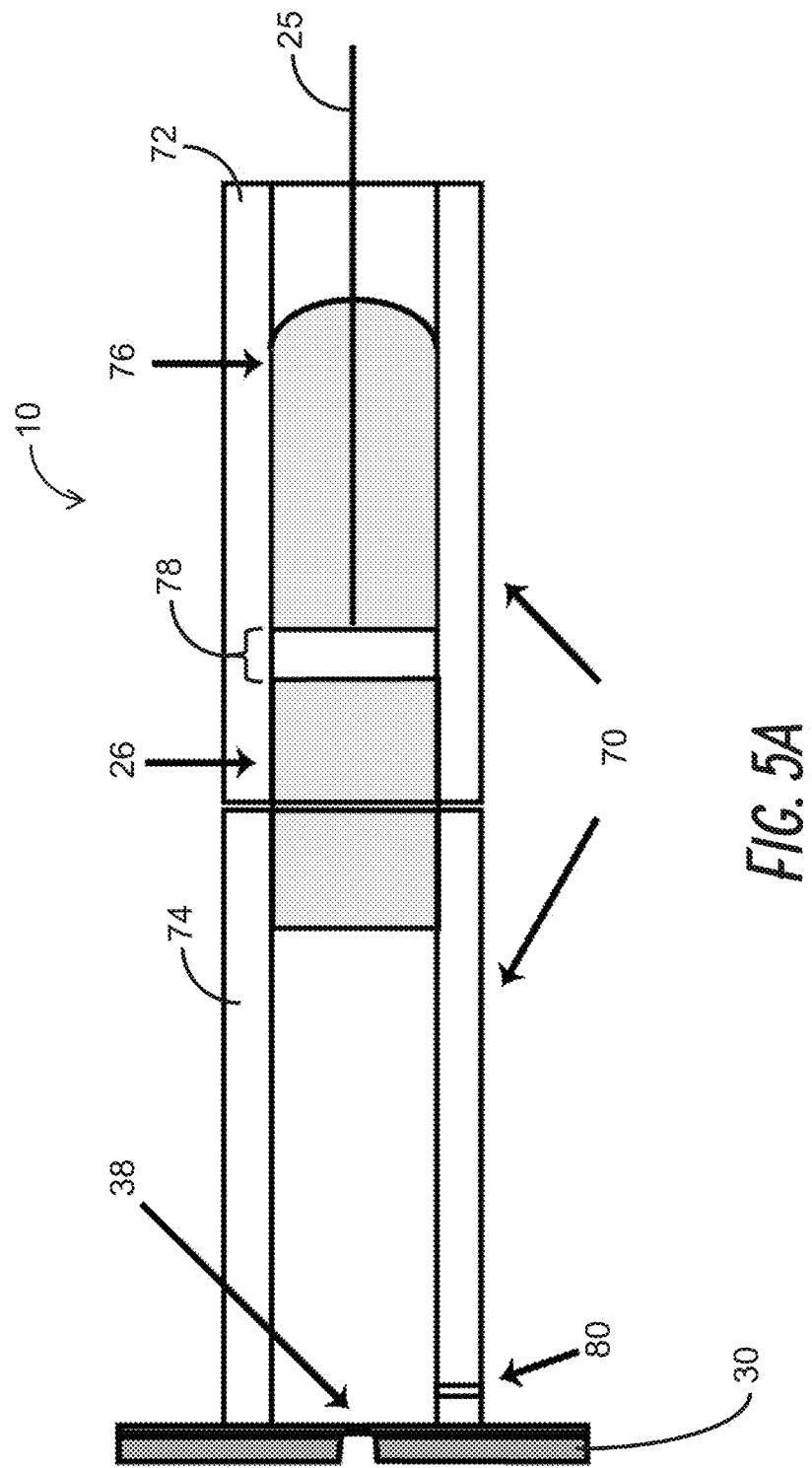

PHASE-FRONT-MODULATION SENSOR

RELATED APPLICATIONS

This application is a continuation of U.S. patent application Ser. No. 15/048,804, filed Feb. 19, 2016, incorporated in its entirety by reference herein, and which claims the benefit of priority to U.S. Provisional Appl. No. 62/119,647, filed Feb. 23, 2015, which is incorporated in its entirety by reference herein.

BACKGROUND

Field

This application relates generally to sensor systems, and more particularly to optical-fiber-compatible acoustic sensor systems.

Description of the Related Art

In membrane-based fiber acoustic sensors, a deflectable membrane is used as a transducer to convert the small vibration induced by an incident acoustic wave into an optical modulation. See, e.g., M. J. Gander, W. N. MacPherson, J. S. Barton, R. L. Reuben, J. D. C. Jones, R. Stevens, K. S. Chana, S. J. Anderson, and T. V. Jones, "Embedded micromachined fiber-optic Fabry-Perot pressure sensors in aerodynamics applications," IEEE Sens. J. 3, 102-107 (2003); L. H. Chen, C. C. Chan, W. Yuan, S. K. Goh, and J. Sun, "High performance chitosan diaphragm-based fiberoptic acoustic sensor," Sensors Actuators A Phys. 163, 42-47 (2010); J. A. Bucaro, N. Lagakos, and B. H. Houston, "Miniature, high performance, low-cost fiber optic microphone," J. Acoust. Soc. Am. 118, 1406-1413 (2005); F. Xu, J. Shi, K. Gong, H. Li, R. Hui, and B. Yu, "Fiber-optic acoustic pressure sensor based on large-area nanolayer silver diaphragm," Opt. Lett. 39, 2838-40 (2014); S. E. U. Lima, O. Frazão, R. G. Farias, F. M. Araújo, L. A. Ferreira, V. Miranda, and J. L. Santos, "Intrinsic and extrinsic fiber Fabry-Perot sensors for acoustic detection in liquids," Microw. Opt. Technol. Lett. 52, 1129-1134 (2010).

These devices are interesting because they are compact, they can exhibit a high sensitivity and a low noise, and they are easily optically multiplexed into large arrays. The high sensitivity arises in part from the high compliance of submicron diaphragms, which will deflect by measurable amounts even under a very slight pressure (e.g., about 90 nm/Pa for a 450-nm thick square diaphragm, 370 μm on the side; see, e.g., W. Jo, O. C. Akkaya, O. Solgaard, and M. J. F. Digonnet, "Miniature fiber acoustic sensors using a photonic-crystal membrane," Opt. Fiber Technol. 19, 785-792 (2013)). Because of this unique set of features, such devices are being studied and developed for a large number of important applications ranging from seismic research (see, e.g., G. Gagliardi, M. Salza, P. Ferraro, P. De Natale, A. Di Maio, S. Carlino, G. De Natale, and E. Boschi, "Design and test of a laser-based optical-fiber Bragg-grating accelerometer for seismic applications," Meas. Sci. Technol. 19, 085306 (2008)) to large structure monitoring (see, e.g., M. Majumder, T. K. Gangopadhyay, A. K. Chakraborty, K. Dasgupta, and D. K. Bhattacharya, "Fibre Bragg gratings in structural health monitoring—Present status and applications," Sensors Actuators A Phys. 147, 150-164 (2008)), underwater surveillance (see, e.g., D. Hill and P. Nash, "Fiber-optic hydrophone array for acoustic surveillance in the littoral," in Photonics for Port and Harbor Security, M. J. DeWeert and T. T. Saito, eds., International Society for Optics and Photonics, 2005, pp. 1-10), MRI-compatible microphones (see, e.g., M. S. NessAiver, M. Stone, V. Parthasarathy, Y. Kahana, A. Paritsky, and A. Paritsky, "Recording high quality speech during tagged cine-MRI studies using a fiber optic microphone," J. Magn. Reson. Imaging 23, 92-7 (2006)), photoacoustic imaging (see, e.g., P. C. Beard, F. Pérennès, E. Draguioti, and T. N. Mills, "Optical fiber photoacoustic—photothermal probe," Opt. Lett. 23, 1235 (1998)), small force measurements (see, e.g., W. Jo and M. J. F. Digonnet, "Piconewton force measurement using a nanometric photonic crystal diaphragm," Opt. Lett. 39, 4533 (2014)), atomic force microscopy (see, e.g., D. Rugar, H. J. Mamin, and P. Guethner, "Improved fiber-optic interferometer for atomic force microscopy," Appl. Phys. Lett. 55, 2588 (1989)), and bio/chemical sensors (see, e.g., X.-D. Wang and O. S. Wolfbeis, "Fiber-optic chemical sensors and biosensors (2008-2012)," Anal. Chem. 85, 487-508 (2013)). Most of these applications utilize very low minimum detectable pressures (MDPs). For example, for underwater oil and gas exploration, the detected pressure is typically in the range of 10-200 μPa/√Hz over a frequency that spans from 100 Hz to 20 kHz.

SUMMARY

In certain embodiments, a sensor is provided which comprises at least one optical waveguide and an optical reflector. The at least one optical waveguide is configured to emit light in a direction. The optical reflector is optically coupled to the at least one optical waveguide, and the optical reflector is configured to reflect at least a portion of the light. The optical reflector comprises a first portion and a second portion. The first portion of the optical reflector is configured to reflect a first portion of the light back to the at least one optical waveguide. The second portion of the optical reflector is configured to reflect a second portion of the light back to the at least one optical waveguide. The second portion of the optical reflector is responsive to a perturbation by moving relative to the first portion of the optical reflector. The reflected second portion of the light differs in phase from the reflected first portion of the light by a phase difference that is not substantially equal to an integer multiple of $\pi$ when the second portion of the optical reflector is in an equilibrium position in absence of the perturbation.

In certain embodiments, a method for fabricating a sensor is provided. The method comprises providing a first tube comprising a ferrule inside the first tube. The ferrule comprises an optical waveguide configured to emit a light beam. The method further comprises inserting at least one lens into the first tube. A portion of the at least one lens extends outwardly past an end of the first tube. The at least one lens is configured to receive the light beam emitted from the optical waveguide. The method further comprises affixing a first end of a second tube to the portion of the at least one lens extending outwardly past the end of the first tube. The method further comprises affixing an optical reflector to a surface of a second end of the second tube.

BRIEF DESCRIPTION OF THE DRAWINGS

FIG. 2A schematically illustrates an example optical reflector in accordance with certain embodiments described herein.

FIG. 2B schematically illustrates another example optical reflector in accordance with certain embodiments described herein.

FIG. 4 schematically illustrates an example reflector in accordance with certain embodiments described herein.

FIG. 5A schematically illustrates an example phase-front-modulation (PFM) sensor in accordance with certain embodiments described herein.

DETAILED DESCRIPTION

Figure 1A:
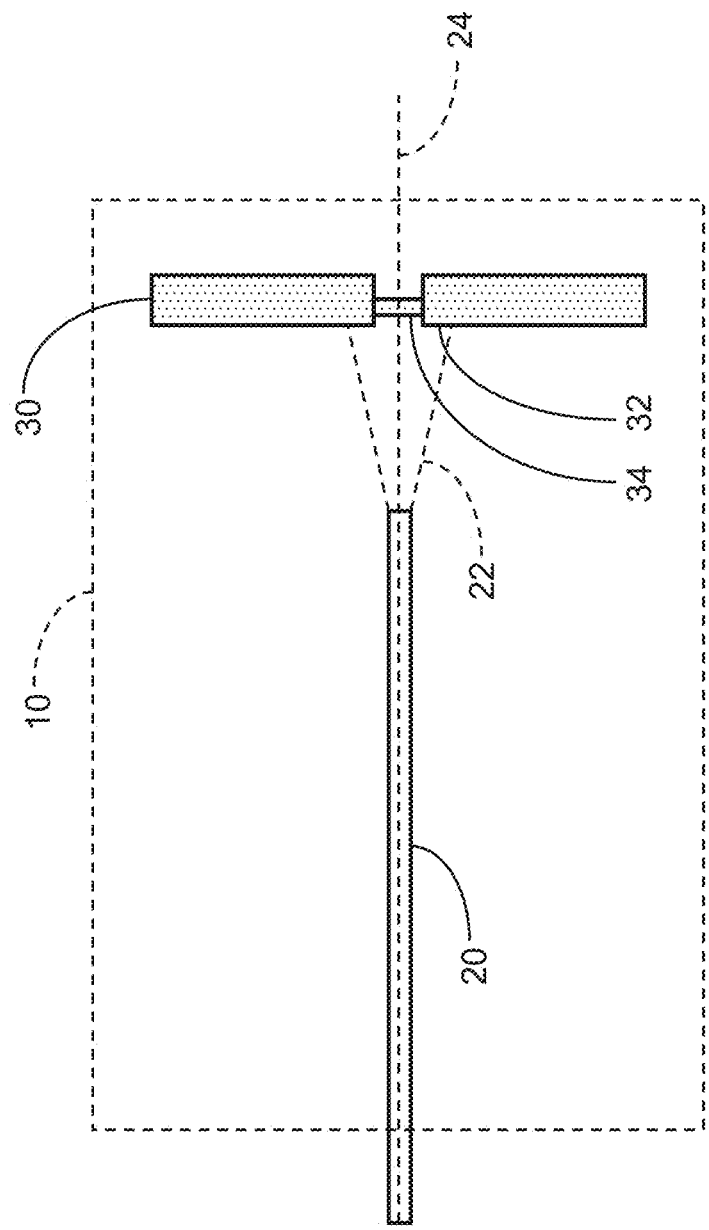
FIG. 1A schematically illustrates an example optical sensor in accordance with certain embodiments described herein.

Of the several types of optical readout demonstrated in membrane-based fiber acoustic sensors, the most sensitive are miniature interferometric Fabry-Perot (FP) sensors constructed at the tip of an optical fiber (see, e.g., W. Jo, O. C. Akkaya, O. Solgaard, and M. J. F. Digonnet, "Miniature fiber acoustic sensors using a photonic-crystal membrane," Opt. Fiber Technol. 19, 785-792 (2013); O. Kilic, M. J. F. Digonnet, G. S. Kino, and O. Solgaard, "Miniature photonic-crystal hydrophone optimized for ocean acoustics," J. Acoust. Soc. Am. 129, 1837-1850 (2011)). The interferometric FP sensor can comprise a deflectable diaphragm, made reflective by any number of means, and the facing reflective end of a single-mode fiber. When the diaphragm is exposed to an acoustic wave, it vibrates, which modulates the distance between the reflectors and therefore modulates the reflectivity of the FP sensor. This reflectivity modulation can be measured with a laser beam launched and collected through the fiber. These devices are very sensitive because of the aforementioned compliance of thin diaphragms, and because as a multiple-wave interferometer, such an interferometric FP sensor can measure extremely small displacements (e.g., about 200 fm/√Hz). Small minimum detectable pressures (MDPs) therefore can be achieved using highly compliant diaphragms (e.g., large diameters, small thicknesses) and a large FP finesse (e.g., high mirror reflectivities).

Various implementations of interferometric FP sensors have been reported, although most references cite either no quantitative sensitivity, or a sensitivity expressed, for example, in V/Pa (which can be made arbitrarily large with a voltage amplifier) (see, e.g., L. H. Chen, C. C. Chan, W. Yuan, S. K. Goh, and J. Sun, "High performance chitosan diaphragm-based fiber-optic acoustic sensor," Sensors Actuators A Phys. 163, 42-47 (2010); W. Wang, N. Wu, Y. Tian, C. Niezrecki, and X. Wang, "Miniature all-silica optical fiber pressure sensor with an ultrathin uniform diaphragm.," Opt. Express 18, 9006-14 (2010); S. E. U. Lima, 0. Frazão, R. G. Farias, F. M. Araújo, L. A. Ferreira, V. Miranda, and J. L. Santos, "Intrinsic and extrinsic fiber Fabry-Perot sensors for acoustic detection in liquids," Microw. Opt. Technol. Lett. 52, 1129-1134 (2010)), which makes comparison impossible. Gander (M. J. Gander, W. N. MacPherson, J. S. Barton, R. L. Reuben, J. D. C. Jones, R. Stevens, K. S. Chana, S. J. Anderson, and T. V. Jones, "Embedded micromachined fiber-optic Fabry-Perot pressure sensors in aerodynamics applications," IEEE Sens. J. 3, 102-107 (2003)) used the Fresnel reflections from a microfabricated silicon diaphragm and the cleaved end of a single-mode fiber to form the FP sensor, and achieved an MDP of 900 mPa/√Hz. In recent years, our group has improved this figure by several orders of magnitude by (1) increasing the compliance of the diaphragms, (2) increasing the FP finesse by increasing the reflectivity of the fiber mirror (with a gold or multi-layer dielectric coating), and (3) increasing the diaphragm reflectivity by writing a photonic crystal in the diaphragm. See, e.g., O. Kilic, M. J. F. Digonnet, G. S. Kino, and O. Solgaard, "Miniature photonic-crystal hydrophone optimized for ocean acoustics," J. Acoust. Soc. Am. 129, 1837-1850 (2011); O. C. Akkaya, M. J. F. Digonnet, G. S. Kino, and O. Solgaard, "Modeling and demonstration of thermally stable high-sensitivity reproducible acoustic sensors," J. Microelectromechanical Syst. 21, 1347-1356 (2012); W. Jo, O. C. Akkaya, O. Solgaard, and M. J. F. Digonnet, "Miniature fiber acoustic sensors using a photonic-crystal membrane," Opt. Fiber Technol. 19, 785-792 (2013). The lowest average MDP in air reported using these techniques is about 2.6 μPa/√Hz between 1 kHz and 30 kHz. In comparison, high-end commercial capacitive microphones have an MDP of about 0.2 μPa/√Hz over a comparable range (see, e.g., Brüel & Kjær, "Type 4179," www.bksv.com/Products/transducers/ acoustic/microphones/microphone-cartridges/4179). These fiber sensors also operate in water, with an MDP as low as 12 μPa/√Hz, which is below sea-state zero, and is comparable to the MDP of piezoelectric-based commercial hydrophones (see, e.g., Teledyne Reason, "TC4032," http://www.teledyne-reson.com/hydrophones/tc-4032/).

Although they exhibit outstanding performance, the FP-based sensors previously developed can be time-consuming to fabricate, with multiple silicate-bonding steps to secure the fiber and diaphragm to a common support. To achieve maximum sensitivity, they also can include either tuning the laser wavelength within a very narrow range in the vicinity of a resonance of the FP sensor (e.g., ±0.5 nm) or tuning the cavity length to a high precision during assembly. Achieving a reproducible cavity length (e.g., for wavelength-multiplexed sensor arrays) is possible for modest numbers of sensors, but can be unwieldy for very large arrays.

Certain embodiments described herein provide a solution in the form of a new type of fiber sensor that utilizes a physical principle new to this field and that is referred to herein generally as a phase-front-modulation (PFM) sensor. In contrast to optical modulators which utilize induced phase change via free-carrier dispersion (see, e.g., B. R. Hemenway, O. Solgaard, and D. M. Bloom, "All-silicon integrated optical modulator for 1.3 µm fiber-optic interconnects," Appl. Phys. Lett. 55, 349 (1989)), certain embodiments described herein provide PFM sensors which, as compared to previously-developed FP-based sensors, are much easier and faster to assemble, offer a much broader and reproducible operating wavelength set in the clean room, and have comparable MDPs for equal diaphragm dimensions.

FIG. 1A schematically illustrates an example sensor 10 in accordance with certain embodiments described herein. While the example sensor 10 is described herein in the context of sensing acoustic pressure waves, various embodiments described herein may more generally be described as comprising a displacement sensor which is responsive to selected perturbations (e.g., acoustic pressure waves, magnetic fields, electric fields, accelerations, other forces) by having two or more portions displaced relative to one another and by providing one or more signals indicative of information regarding one or more aspects of the perturbations (e.g., magnitude, frequency, waveform).

The sensor 10 can comprise at least one optical waveguide 20 configured to emit light 22 in a direction 24. The sensor 10 can further comprise an optical reflector 30 optically coupled to the at least one optical waveguide 20. The optical reflector 30 is configured to reflect at least a portion of the light 22 and comprises a first portion 32 of the optical reflector 30 and a second portion 34 of the optical reflector 30. The first portion 32 of the optical reflector 30 (e.g., a first surface) is configured to reflect a first portion of the light back to the at least one optical waveguide 20. The second portion 34 of the optical reflector 30 (e.g., a second surface parallel to a first surface of the first portion 32 of the optical reflector 30) is configured to reflect a second portion of the light back to the at least one optical waveguide 20. The second portion 34 of the optical reflector 30 is responsive to a perturbation (e.g., a pressure wave incident on the sensor 10) by moving relative to the first portion 32 of the optical reflector 30. The second portion 34 of the optical reflector 30 is offset from the first portion 32 of the optical reflector 30 along the direction 24 such that the reflected second portion of the light differs in phase from the reflected first portion of the light by a phase difference that is not substantially equal to an integer multiple of $\pi$ when the second surface 34 is in an equilibrium position in absence of the perturbation. For example, a maximum sensitivity can be achieved in certain embodiments in which the phase difference is substantially equal to an odd integer multiple of $\pi/2$ (e.g., $\pm\pi/2$, $\pm 3\pi/2$, $\pm 5\pi/2$). As used herein, the phrase "substantially equal to" as used in describing the phase difference refers to phase differences that are within $\pm 10\%$ of the cited value (e.g., within $\pm 5\%$ of the cited value, within $\pm 2\%$ of the cited value).

In certain embodiments, the phase difference has a magnitude that is in at least one of the following ranges: substantially greater than zero and substantially less than $\pi$, substantially greater than $\pi$ and substantially less than $2\pi$, and substantially greater than $2\pi$ and substantially less than $3\pi$. In certain embodiments, the phase difference has a magnitude that is in at least one of the following ranges: substantially greater than zero and less than or equal to $\pi/2$, greater than or equal to $\pi/2$ and substantially less than $\pi$, substantially greater than $\pi$ and less than or equal to $3\pi/2$, greater than or equal to $3\pi/2$ and substantially less than $2\pi$, substantially greater than $2\pi$ and less than or equal to $5\pi/2$, and greater than or equal to $5\pi/2$ and substantially less than $3\pi$. As used herein, the phrase "substantially greater than" as used in describing the ranges of the phase difference magnitude refer to phase difference magnitudes that are greater than 102% of the cited value (e.g., greater than 105% of the cited value, greater than 110% of the cited value). As used herein, the phrase "substantially less than" as used in describing the ranges of the phase difference magnitude refer to phase difference magnitudes that are less than 98% of the cited value (e.g., less than 95% of the cited value, less than 90% of the cited value). As used herein, the phrase "substantially greater than zero" as used in describing the ranges of the phase difference magnitude refer to phase difference magnitudes that are greater than $\pi/8$. In certain embodiments, the phase difference is selected to provide an amount of sensitivity that is adequate for the purposes for which the sensor 10 is being used.

Figure 1B:
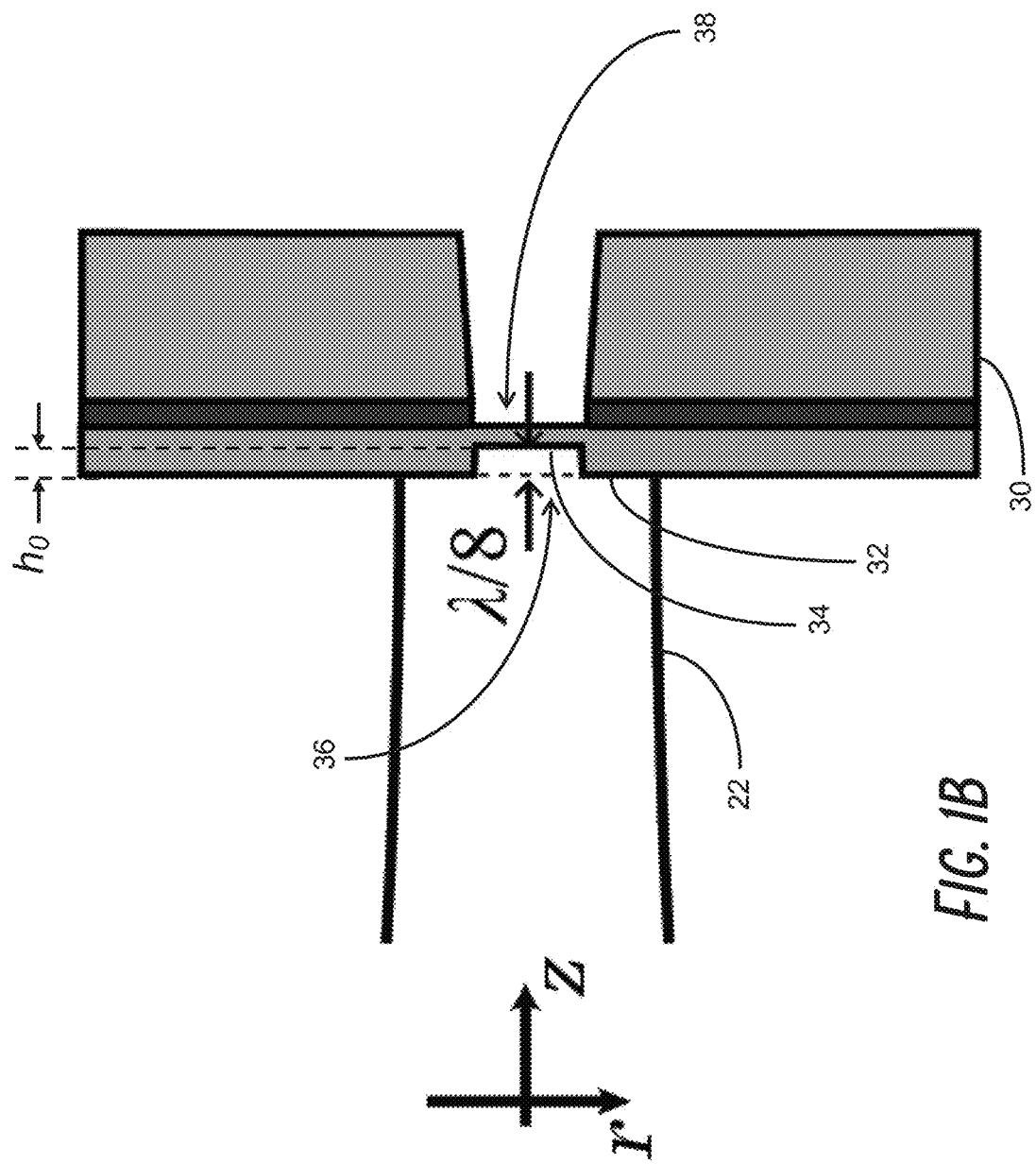
FIG. 1B schematically illustrates a cross-section of an optical reflector in accordance with certain embodiments described herein.

In certain embodiments, the at least one optical waveguide 20 comprises an optical fiber 25. For example, as schematically illustrated by FIG. 1D, at least one laser 40 can generate light having at least one wavelength and can be optically coupled to the at least one optical waveguide 20 (e.g., comprising a single-mode optical fiber 25) via at least one optical coupler 42 (e.g., an optical circulator) to provide light having a power level of $P_{in}$ to an input of the at least one optical waveguide 20. The at least one optical coupler 42 can be further optically coupled to an optical analyzer 44 (e.g., a dynamic signal analyzer) such that light having a power level of $P_{out}$ emitted from the input of the at least one optical waveguide 20 is provided to the optical analyzer 44. In certain embodiments, as schematically illustrated by FIG. 1D, the optical analyzer 44 comprises an optical amplifier 46 configured to amplify the light received from the at least one optical waveguide 20. In certain embodiments, the at least one optical waveguide 20 does not comprise an optical fiber 25, but can be part of an integrated optical circuit that uses the at least one optical waveguide 20 to transport input optical signals to the optical reflector 30 and to transport reflected optical signals from the optical reflector 30 (e.g., to an optical analyzer 44).

In certain embodiments, the at least one optical waveguide 20 can further comprise at least one lens 26 (e.g., a graded-index (GRIN) lens) which modifies the spatial configuration of the light 22. The at least one lens 26 can be configured to receive the light 22 from the optical fiber 25 and to transmit the light towards the optical resonator 30. For example, the optical fiber 25 can transmit the light 22 as a light beam from an output of the optical fiber 25, and the at least one lens 26 can be configured to collimate the light 22 from the optical fiber 25 and to return the reflected first and second portions of the light to the optical fiber 25. In certain embodiments, the optical fiber 25 and the at least one lens 26 are integral with one another forming a unitary optical waveguide 20 or a monolithic optical waveguide 20. For example, the at least one lens 26 can be mechanically coupled or otherwise affixed to an end of the optical fiber 25. In certain other embodiments, the at least one lens 26 is separate from (e.g., not integral with, not forming a unitary structure with) the optical fiber 25.

An optical reflector 30 (e.g., comprising a semiconductor wafer) can be placed a short, non-critical distance (e.g., a few millimeters) from the at least one optical waveguide 20. In certain embodiments, the optical reflector 30 comprises at least one of the following materials: silicon, silicon nitride, silicon carbide, graphene. The reflector 30 can comprise a first portion 32 that is optically reflective. For example, the first portion 32 can comprise an optically-reflective first surface (e.g., an optical-quality planar surface of the wafer, a metal layer) or an optically-reflective structure (e.g., a photonic crystal structure).

The reflector 30 can further comprise a region 36 bounded at least in part by the first portion 32. For example, the region 36 can comprise a well microfabricated into the wafer (e.g., having a λ/8 depth and a planar bottom), as schematically illustrated by FIG. 1B. In certain embodiments, the well can have a perimeter in a plane parallel to the first surface of the first portion 32 that is circular, square, rectilinear, triangular, or another shape. In certain embodiments, the perimeter of the well can be surrounded by the first portion 32 or can be bounded on one, two, or more sides by the first surface of the first portion 32.

The second portion 34 of the reflector 30 can comprise a diaphragm in the region 36 (e.g., at the bottom of the well). The diaphragm 38 can be significantly thinner (e.g., by hundreds of nanometers) than portions of the wafer surrounding the diaphragm 38 such that the diaphragm 38 is elastically movable and/or elastically deformable in response to the perturbation. 38. In certain embodiments, the diaphragm 38 can have a shape in a plane parallel to the first surface of the first portion 32 that is circular, square, rectilinear, triangular, or another shape. The diaphragm 38 can comprise a reflective second surface in the region 36 (e.g., at the bottom of the well) or an underlying reflective layer in the region 36 (e.g., beneath a surface of the bottom of the well).

In certain embodiments, the collimated light 22 from the at least one optical waveguide 20 can be positioned and can have a width such that a first portion of the light 22 is incident on the first portion 32 of the reflector 30, while a second portion of the light 22 is incident on the second portion 34 of the reflector 30 (e.g., the diaphragm 38 in the well). In certain embodiments, the ratio of the optical power of the first portion of the light 22 to the optical power of the second portion of the light 22 is in a range between 0.3 and 0.7, in a range between 0.4 and 0.6, or in a range between 0.45 and 0.55.

In certain embodiments, as schematically illustrated by FIGS. 1A, 1B, and 1D, the light 22 can have a width that is greater than a width of the well and can be positioned such that the light 22 irradiates the whole area of the second portion 34 (e.g., irradiates the whole bottom area of the well) and irradiates at least some of the first portion 32 of the reflector 30. For example, the light 22 can be centered on the well and the first portion of the light 22 (e.g., an outer portion) can be incident on the first portion 32 of the reflector outside the well, while the second portion of the light 22 (e.g. an inner or central portion) of the light 22 is incident on the second portion 34 of the reflector 30 (e.g., the diaphragm 38 in the well). In certain other embodiments, the light 22 can have a width that is less than or equal to a width of the well and can be positioned such that the light 22 irradiates at least a portion of the perimeter of the well such that a first portion of the light 22 is incident on the first portion 32 of the reflector 30 outside the well, while a second portion of the light is incident on the second portion 34 of the reflector 30 (e.g., the diaphragm 38 in the well).

The light reflected from the first portion 32 of the reflector 30 and the second portion 34 of the reflector 30 can form a reflected beam of light which is returned to the at least one optical waveguide 20 (e.g., via the at least one lens 26). In certain embodiments, the ratio of the optical power of the reflected first portion of the light 22 to the optical power of the reflected second portion of the light 22 is in a range between 0.3 and 0.7, in a range between 0.4 and 0.6, or in a range between 0.45 and 0.55.

Figure 1C:
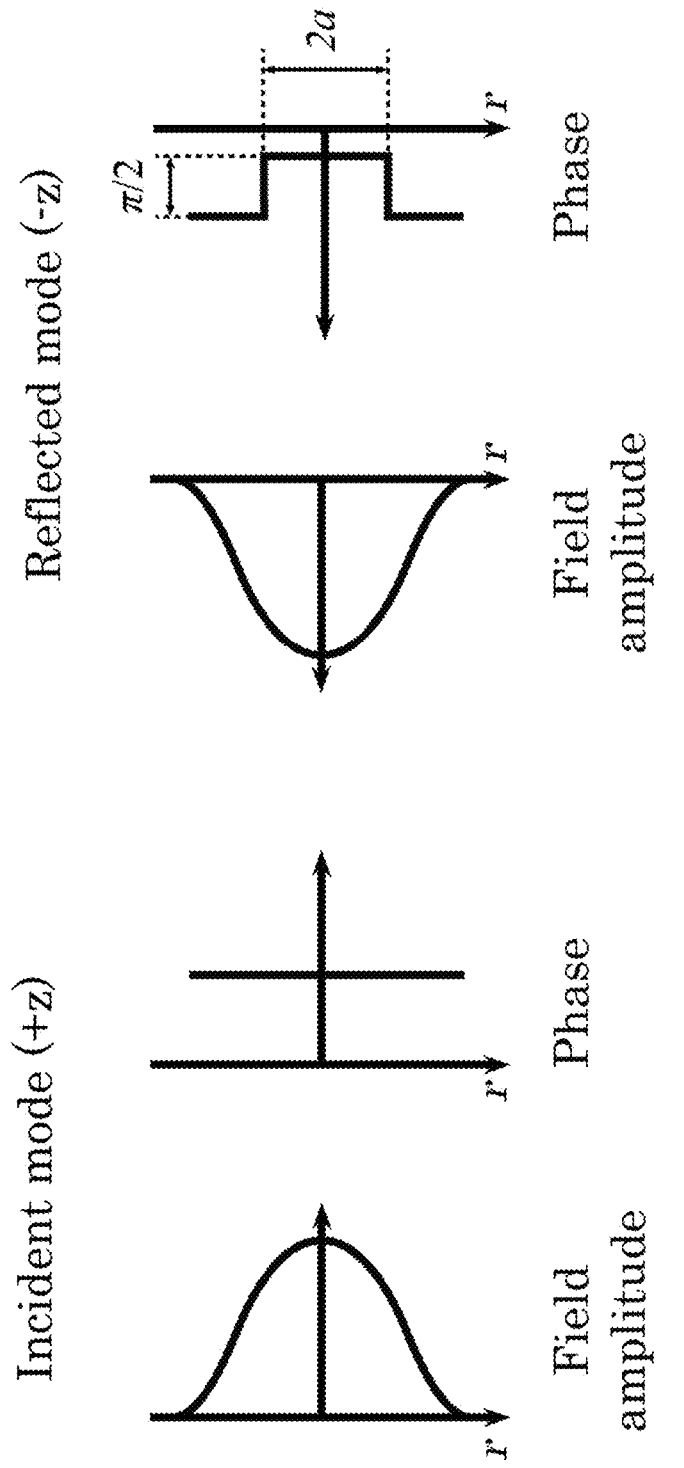
FIG. 1C schematically illustrates example phase fronts of the incident and reflected beams in accordance with certain embodiments described herein.
Figure 1D:
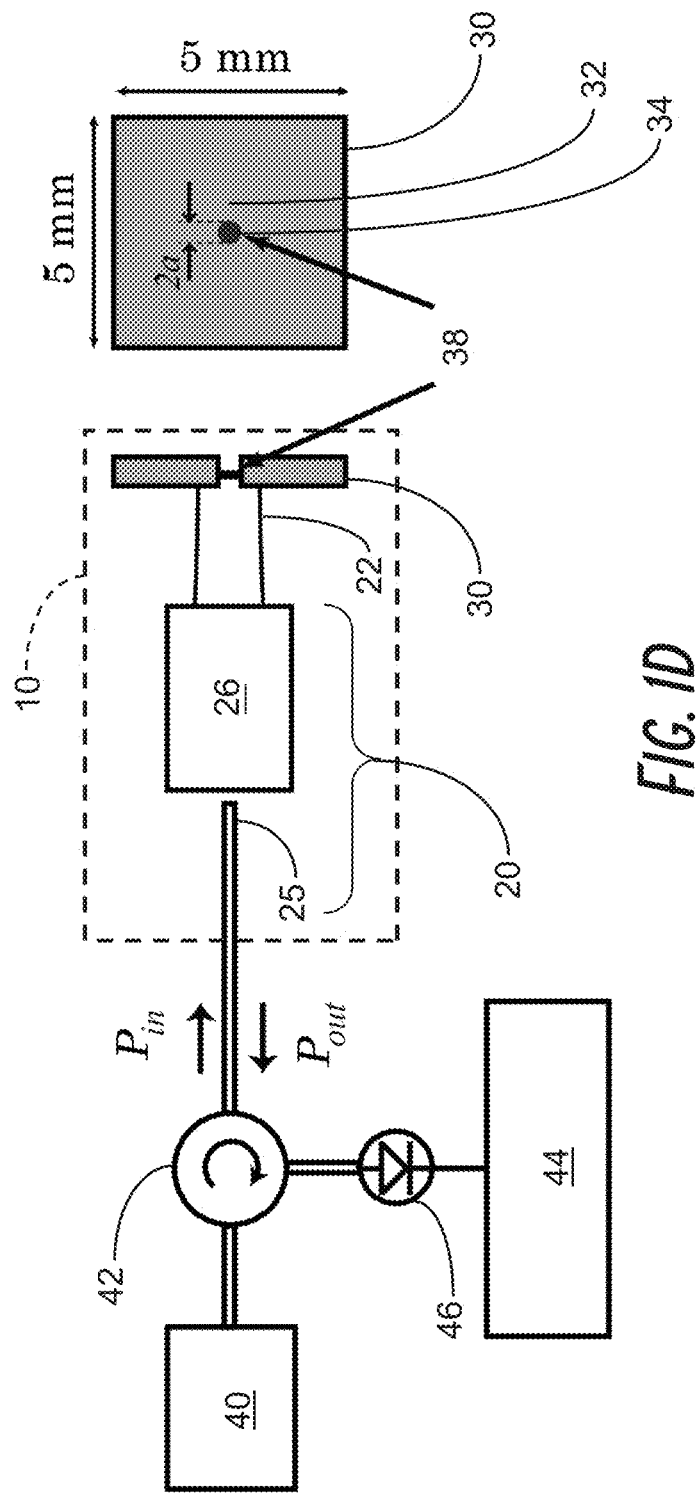
FIG. 1D schematically illustrates another example optical sensor in accordance with certain embodiments described herein.

In certain embodiments, the depth of the well (e.g., one-eighth of the wavelength of the light, which can be expressed as λ/8) can be selected such that after reflection in the absence of a perturbation (e.g., in an equilibrium position of the diaphragm 38), the two reflected portions are in quadrature, as schematically illustrated by FIG. 1C. The reflector 30 can be oriented perpendicular to the direction 24 of the light 22 so that the reflected beam is sent back through the at least one lens 26 (e.g., the GRIN lens) and is focused onto the core of the optical fiber 25 of the at least one optical waveguide 20. Because of the intentional phase mismatch between the inner and outer portions of the reflected beam, after the reflected beam is focused back to the at least one optical waveguide 20 (e.g., to the core of the optical fiber 25 via the at least one lens 26 at the output of the at least one optical waveguide 20), it does not couple well (e.g., $P_{out}/P_{in}$ equals about 50%) into the single-mode fiber core. The returning optical power from the input port of the at least one optical waveguide 20 (e.g., measured by the optical analyzer 44) can then be low.

When a perturbation (e.g., a static acoustic pressure) is incident on the reflector 30, the diaphragm 38 can be displaced with respect to the thicker outer portion of the reflector 30. This displacement from the equilibrium position of the diaphragm 38 can modify the relative phase between the inner and outer portions of the reflected beam, which changes the coupling efficiency of the reflected beam to the at least one optical waveguide 20 (e.g., into the core of the optical fiber 25), and thus changing the optical power returning from the sensor 10, as schematically illustrated by FIG. 1D. A measurement of this power change can provide the magnitude of the perturbation (e.g., the value of the applied pressure). The principle is the same for a dynamic pressure at frequency $f_\alpha$. The diaphragm 38 then vibrates at frequency $f_\alpha$, the returning signal is modulated at $f_\alpha$, and the measurement can provide both the amplitude and frequency of the pressure wave.

In certain embodiments, the depth of the well of the region 36 of the reflector 30 is selected to provide the preselected phase difference between the two reflected portions. Selection of the depth of the well can advantageously provide a relatively simple fabrication for the sensor 10. However, in certain other embodiments, other structural attributes (e.g. materials, structures) of the region 36 and of the first portion 32 of the reflector 30 can be selected to provide the preselected phase difference between the two reflected portions. For example, one or both of the region 36 and the first portion 32 can have an appropriate photonic crystal structure, including appropriate materials, to provide the preselected phase difference between light reflected from the region 36 and light reflected from the first portion 32.

An example reflector 30 in accordance with certain embodiments described herein was fabricated at Stanford Nanofabrication Facility on a 4-inch silicon-on-insulator (SOI) wafer with a 2-μm device layer and a buried oxide layer. Fabrication utilized conventional clean-room techniques and equipment. A sensor 10 of certain such embodiments can be more straightforward and faster to fabricate than photonic-crystal FP sensor heads because of its simplicity and greater tolerance on physical dimensions. The top surface of the fabricated phase plate was coated with a 7-nm chromium adhesion layer and a 15-nm gold layer to increase its power reflectivity to a measured value of about 70%.

FIGS. 2A and 2B schematically illustrate two example reflectors 30A, 30B (e.g., formed from a silicon-on-insulator wafer) in accordance with certain embodiments described herein. In FIG. 2A, the example reflector 30A is schematically shown in a top view (the top portion of FIG. 2A) and in a cross-sectional view (the bottom portion of FIG. 2A) along the dashed line in the top portion of FIG. 2A. The example reflector 30A comprises a movable portion 50 (e.g., a diaphragm 38 of the second portion 34 of the reflector 30), a non-movable portion 52 comprising the first portion 32 of the reflector 30, and a plurality of spring structures 54 mechanically coupled to the movable portion 50 and to the non-movable portion 52. While the example reflector 30A of FIG. 2A has eight spring structures 54, other reflectors 30A with 2, 3, 4, 5, 6, 7, 9, 10, or more spring structures 54 are also compatible with certain embodiments described herein. The movable portion 50 and the plurality of spring structures 54 can be defined (e.g., separated from the non-movable portion 52) by a plurality of gaps 56 cut into the example reflector 30A (e.g., using microfabrication techniques). The example reflector 30A is configured to have the movable portion 50 vibrate by translating in a direction 58 that is generally perpendicular to the movable portion 50 (e.g., the diaphragm 38) while the movable portion 50 generally retains its shape (e.g., planar), and while the spring structures 54 elastically stretch and move.

In FIG. 2B, another example reflector 30B is schematically shown in a top view (the top portion of FIG. 2B) and in a cross-sectional view (the bottom portion of FIG. 2B) along the dashed line in the top portion of FIG. 2B. The example reflector 30B comprises a movable portion 60 (e.g., a diaphragm 38 comprising the second portion 34 of the reflector 30) and a non-movable portion 62 comprising the first portion 32 of the reflector 30. The diaphragm 38 can be mechanically coupled to the first portion 32 of the reflector 30 along a perimeter of the diaphragm 30 (e.g., by an edge 64 of the non-movable portion 62 that is mechanically coupled to the movable portion 60). The example reflector 30B is configured to have the movable portion 60 vibrate, not by translating, but by elastically bowing back and forth (e.g., elastically stretching and moving) in a direction 68 that is generally perpendicular to the movable portion 60 (e.g., the diaphragm 38), thereby changing the shape of the movable portion 60. When not vibrating, the movable portion 60 of the example reflector 30B can have a planar shape.

In certain embodiments, since the movable portion 50 of the example reflector 30A generally translates without distortion of its shape, the example reflector 30A can advantageously provide freedom to select a size and thickness of the movable portion 50 independently of the stress-responsive properties of the movable portion 50. Thus, an acoustic sensor 10 utilizing the example reflector 30A in certain embodiments can be optimized for the use of various beam sizes and pressure levels. In certain embodiments, the example reflector 30B has a simpler fabrication process than does the example reflector 30A, however it has a lower optical sensitivity because the movable portion 60 of the example reflector 30B bows instead of merely translating in a direction generally perpendicular to its surface.

Figure 3:
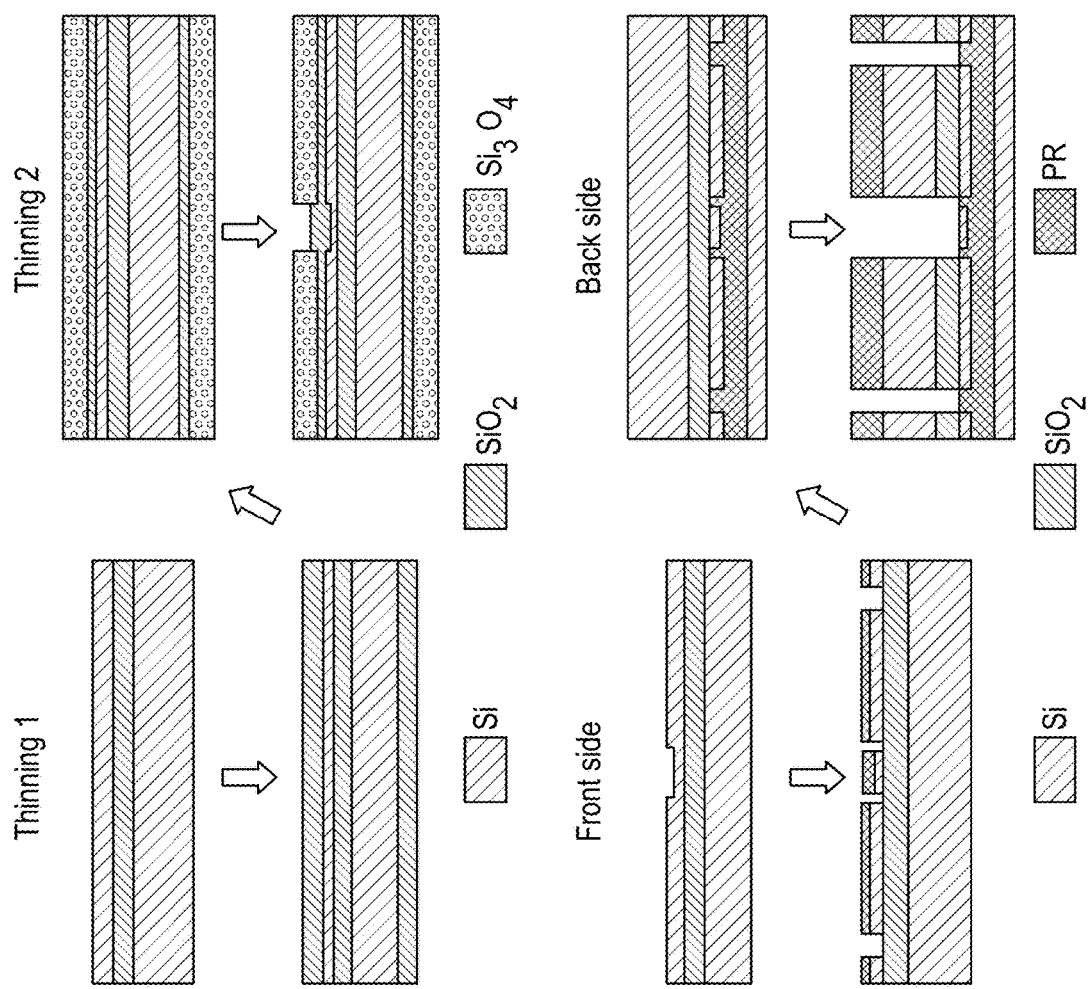
FIG. 3 schematically illustrates an example fabrication process of a reflector in accordance with certain embodiments described herein.

FIG. 3 schematically illustrates an example fabrication process of a reflector 30 in accordance with certain embodiments described herein. In certain embodiments, the fabrication process of the reflector 30 involves two steps of device thinning by thermal oxidation following a dry etching process (e.g., to define spring structures 54 and to release the movable portion 50 of the example reflector 30A). The example fabrication process of FIG. 3 is compatible with fabricating the example reflector 30A (e.g., including defining the spring structures 54) and with fabricating the example reflector 30B (e.g., not defining the spring structures 54 around the movable portion 60). Note that the process shows the fabrication process of an example reflector 30A. The example reflectors 30B were fabricated using the same process except the spring structures 54 were not defined around the sensor diaphragm 38.

FIG. 4 schematically illustrates an example reflector 30A with four spring structures 54 in accordance with certain embodiments described herein. The left side of FIG. 4 shows a cross-section of the example reflector 30A and the right side of FIG. 4 shows a top view of the example reflector 30A. The perforations 70 along the left portion of the structure shown on the right side of FIG. 4 can be used to separate the example reflector 30A from the surrounding portion of the wafer at the appropriate stage of fabrication. The example reflector 30A can have various sizes and shapes in accordance with certain embodiments described herein. In FIG. 4, a generally circular diaphragm 38 comprises the moving portion 50 that is mechanically coupled to the surrounding non-moving portion 52 (e.g., the surrounding portions of the wafer) by a plurality of spring structures 54 (e.g., four elongate structures that are configured to distort elastically such that the diaphragm 38 translates in a direction that is generally perpendicular to the plane of the diaphragm 38). Various sizes of reflectors 30A, diaphragms 38, and spring structures 54 with various compliances can be used. For example, two sizes of diaphragms 38 (with radius $\alpha=120$ μm, 140 μm) with 5 different compliances (spring constants) can be fabricated at the same time. Other sizes and shapes of the diaphragm 38 and the spring structures 54, number of spring structures 54, arrangements of spring structures 54, compliance of the spring structures 54 may be used in accordance with certain embodiments described herein.

For an example reflector 30B in which the diaphragm 38 is configured to bow (e.g., using a movable portion 60), diaphragms 38 of various shapes, sizes, and thicknesses can be used. For example, a reflector 30B can comprise a generally circular diaphragm 38 with a thickness in a range between 0.3 μm to 1.5 μm (e.g., 0.45 μm, 1.1 μm) with a radius $\alpha=100$ μm, 110 μm, 120 μm, 130 μm, 140 μm, 150 μm, 160 μm, 170 μm, 180 μm, or 190 μm. Other structural parameters of the reflector 30B may be used in accordance with certain embodiments described herein.

There are many possible modifications that can be made to improve the sensitivity and usability of the PFM sensor for different applications in accordance with certain embodiments described herein. For example, different types of reflectors 30 can be implemented at the sensor surface. It can be desirable to maximize the reflectivity of the sensor surface because the sensitivity is proportional to the reflectivity. In the example PFM sensor that was fabricated, a gold coating was used to achieve reflectivity of about 70%. The reflectivity can be increased using different high-reflection coatings such as silver, aluminum, and dielectrics. Also, a photonic crystal bandgap structure could be fabricated for the sensor diaphragm 38 and the rest of sensor surface, which can increase its reflectivity (e.g., up to about 99%). For another example, the diaphragm shape is not limited to a circular shape, and it can be fabricated in other desirable shapes (e.g., rectangular). In certain embodiments, the spring structures 54 can be simple elongate structures that are configured to stretch, while in certain other embodiments, other spring structures 54 (e.g., spiral springs, folded springs) can be used to suspend the movable portion 50 (e.g., the sensor diaphragm 38). In certain embodiments, the at least one lens 26 of the sensor 10 schematically illustrated by FIG. 1D (e.g., the GRIN lens) can be replaced with one or more lenses configured to collimate a laser beam to a target mode size.

Figure 5B:
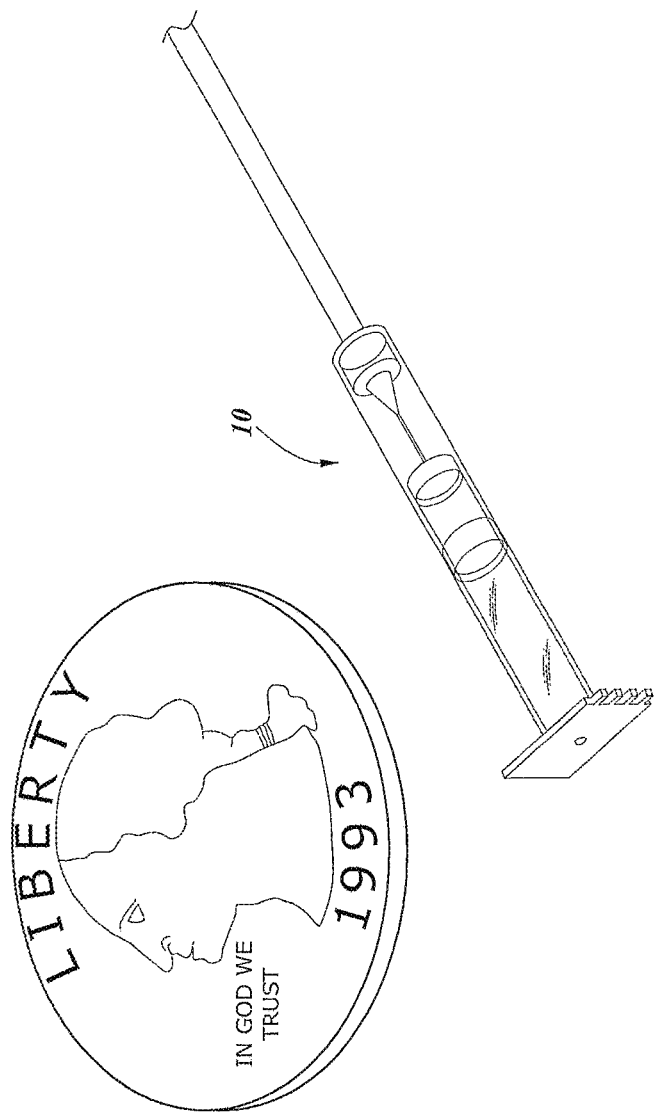
FIG. 5B is a photograph of an example PFM sensor in accordance with certain embodiments described herein.

FIG. 5A schematically illustrates an example PFM sensor 10 in accordance with certain embodiments described herein and FIG. 5B is a photograph of an example PFM sensor 10 in accordance with certain embodiments described herein. In certain embodiments, the at least one optical waveguide 20 comprises an optical fiber 25 and at least one lens 26 (e.g., a collimator, which can include a commercially-available 0.23-pitch GRIN lens), at least one tube 70, and a fiber-pigtailed ferrule 76 mechanically coupled to the at least one optical waveguide 20, as schematically illustrated by FIG. 5A. In certain embodiments, the at least one tube 70 and the ferrule 76 can both be made of glass.

In certain embodiments, an example method for fabricating an example sensor comprises providing a first tube 72 comprising a ferrule 76 inside the first tube 72, the ferrule 76 comprising an optical waveguide 25 configured to emit a light beam. The example method further comprises inserting at least one lens 26 into the first tube 72, a portion of the at least one lens 26 extending outwardly past an end of the first tube 72, the at least one lens 26 configured to receive the light beam emitted from the optical waveguide 25. The example method further comprises affixing a first end of a second tube 74 to the portion of the at least one lens 26 extending outwardly past the end of the first tube 72. The example method further comprises affixing an optical reflector 30 to a surface of a second end of the second tube 74.

During an example fabrication process in accordance with certain embodiments described herein, the at least one tube 70 comprises a first tube 72 and a second tube 74. The at least one lens 26 (e.g., GRIN lens) and the ferrule 76 can be inserted inside the first tube 72, with a portion of the at least one lens 26 extending outwardly past an end of the first tube 72. The distance 78 between the ferrule 76 and the at least one lens 26 can be adjusted to modify the radius of the collimated beam propagating from the at least one lens 26. For example, the sensor 10 shown in FIG. 5B can be fabricated such that the collimated beam emitted from the at least one lens 26 extending from the end of the first tube 72 can have a radius of about 630 μm (e.g., an optimum size for a diaphragm of radius α=380 μm) at the planned location of the diaphragm 38 (e.g., 8 mm away from the output face of the at least one lens 26). Once the target beam size is achieved (e.g., measured using a mechanical chopper), the ferrule 76 and the at least one lens 26 can be bonded to the first tube 72 (e.g., using an epoxy).

In certain embodiments, the second tube 74 can then be affixed (e.g., using epoxy) to the portion of the at least one lens 26 extending outwardly past the end of the first tube 72. This intermediate assembly can then be held vertically and the reflector 30 (e.g., comprising a silicon structure) can be placed at the top of the second tube 74. This example method can ensure that the angular alignment of the beam with respect to the reflector 30 is determined by the parallelism of the surface of the reflector 30 and the end of the second tube 74 (e.g., which can be polished perpendicular to the longitudinal axis of the second tube 74 within ±0.2 degree). Once the diaphragm 38 and beam are well aligned, as determined by a measurement of the returning power, a small weight can be placed on top of the silicon phase plate of the reflector 30, and epoxy can be applied to bond the phase plate of the reflector 30 to the second tube 74.

Prior to assembly, at least one vent hole 80 can be made (e.g., drilled) through the side of the second tube 74, as schematically illustrated by FIG. 5A. In certain such embodiments, the at least one vent hole 80 can equalize the pressure of the closed volume of the medium (e.g., air, or water in the case of a hydrophone) contained in the second tube 74 and the pressure outside the second tube 74. Without this at least one vent hole 80, variations in either the temperature of the contained volume of the medium or in the outside static pressure may displace the diaphragm 38 and alter the sensitivity.

The normalized sensitivity $S_N$ of an acoustic sensor can be defined as the change in reflected power for a given incident pressure, and normalized to the laser power incident on the sensor. The normalized sensitivity $S_N$ is then equal to the product of the differential pressure that develops across the diaphragm (acoustic response $R_\alpha$), the flexibility of the diaphragm (mechanical compliance $C_m$), and the optical sensitivity (displacement sensitivity $\sigma$). The acoustic response can be calculated using the same approaches as reported previously (W. Jo, O. C. Akkaya, O. Solgaard, and M. J. F. Digonnet, "Miniature fiber acoustic sensors using a photonic-crystal membrane," Opt. Fiber Technol. 19, 785-792 (2013)), and the mechanical compliance (e.g., of the circular diaphragm) can be expressed using the closed-form expression derived previously (S. P. Timoshenko and S. Woinowsky-Krieger, *Theory of Plates and Shells* (McGraw-Hill, 1959)). The displacement sensitivity $\sigma$ can be determined from the coupling coefficient $\eta$ of the reflected beam into the waveguide (e.g., the core of the single-mode fiber):

$$\eta = |2\pi \int_0^\infty E_0^*(r) E_r(r) e^{i\Phi(r)} r\, dr|^2 \tag{1}$$

where $E_0(r)$ is the electric field of the fiber $LP_{01}$ mode (normalized to a power of unity), r is the radial direction in the fiber's cylindrical coordinates (e.g., as defined in FIG. 1B), and $E_r(r) e^{i\Phi(r)}$ is the normalized electric field of the focused reflected beam at the end of the fiber. The partial phase-front modulation imparted to the reflected field by the well in the diaphragm can be expressed as:

$$\phi(r) = 0 \qquad \text{for } r \geq a \tag{2}$$
$$\phi(r) = 2\frac{2\pi(h_0 + h(r))}{\lambda} = \phi_b + \delta\phi(r) \quad \text{for } r < a$$

where $\alpha$ and $h_0$ are the radius and depth of the well, respectively, $\lambda$ is the optical wavelength, and h(r) is the small diaphragm displacement imparted by an incident acoustic pressure. The term $\phi_b = 4\pi h_0/\lambda$ is the phase difference between the inner and outer portions of the reflected beam (e.g., the phase bias of the two-wave interferometer). The second term $\delta\phi(r) = 4\pi h(r)/\lambda$ is the small perturbation of this phase difference induced by the incident pressure.

When exposed to a pressure, a rigidly displaced diaphragm 38 (e.g., as schematically illustrated by FIG. 2A) moves in a direction perpendicular to the diaphragm 38 without substantially bowing, such that neither h nor δφ are functions of the radial position r. When exposed to a pressure, a bowing diaphragm 38 (e.g., as schematically illustrated by FIG. 2B) does not move solely perpendicularly to the diaphragm 38 but actually bows, and therefore both h and δφ are functions of the radial position r. To accurately calculate the spatial dependence of the phase shift across a reflective bowing diaphragm 38, and thus the coupling coefficient and its dependence on applied pressure, the actual profile h(r) of the bowing diaphragm 38 can be taken into account. For a homogeneous circular membrane with constrained motion on its perimeter, this profile can be expressed as:

$$h(r) = h_m\left(1 - \frac{r^2}{a^2}\right)^2 \quad (3)$$

where $h_m$ is the peak displacement amplitude, proportional to the applied pressure. The displacement sensitivity is related to the coupling coefficient by:

$$\sigma = \lim_{h_m \to 0} \frac{d\eta}{dh_m} \quad (4)$$

The coupling coefficient (Eq. 1) and the displacement sensitivity (Eq. 4) can be calculated numerically. However, a closed-form expression of the sensitivity can also be derived to gain insight into the device behavior. With straightforward manipulation, to first order in the perturbation $h_m$, Equation 1 can be rewritten as:

$$\eta = I_1^2 + I_2^2 + 2I_1 I_2 \cos(\phi_b) - \frac{8\pi}{\lambda} I_2 I_3 \sin(\phi_b) h_m \quad (5)$$

where $I_1$, $I_2$ and $I_3$ are overlap integrals involving the reflected field, the $LP_{01}$ fiber mode field. In the case of $I_3$, the r-dependent displacement of the diaphragm can be expressed as:

$$I_1 = 2\pi \int_0^a E_0^*(r) E_r(r) r\, dr \quad (6a)$$

$$I_2 = 2\pi \int_a^\infty E_0^*(r) E_r(r) r\, dr \quad (6b)$$

$$I_3 = 2\pi \int_0^a E_0^*(r) E_r(r) \left(1 - \frac{r^2}{a^2}\right)^2 r\, dr \quad (6c)$$

For a given diaphragm radius α, collimated beam radius W, and fiber mode spot size, $I_1$ and $I_2$ have a fixed numerical value independent of the amplitude $h_m$ of the displacement. The perturbation (diaphragm displacement) is contained entirely in $I_3$.

Equation 5 has the classical form of the response of a two-wave interferometer. The displacement sensitivity (Eq. 4) can be easily calculated by taking its derivative with respect to $h_m$, which gives:

$$\sigma = -\frac{8\pi}{\lambda} I_2 I_3 \sin(\varphi_b) \quad (7)$$

This result provides a simple expression for displacement sensitivity of an example phase-front modulation sensor. It states in particular that the sensor responds linearly to a small displacement (and therefore to a pressure), and that the displacement sensitivity is maximum when the phase bias is $\phi_b = 4\pi h_0/\lambda = \pi/2$, as expected for a two-wave interferometer, or equivalently a well depth $h_0 = \lambda/8$, as stated herein. The analytical expression of the displacement sensitivity (Eq. 7) agrees well with numerical evaluation of Equation 1 over a wide range of values of the beam and well radii.

This result shows, and simulations concur, that the displacement sensitivity for this example PFM sensor, in accordance with certain embodiments described herein, is maximum when four conditions are met, namely: (1) the well depth is $\lambda/8$ (independently of the relative sizes of the diaphragm and incident beam), (2) the diaphragm radius is 64% of the beam radius (which maximizes the product $I_2 I_3$ in Eq. 7), (3) the reflectivity of the phase plate is 100% (which maximizes the amplitude of the reflected field $E_r(r)$ in the integrals of Eqs. 6a-6c), and (4) the phase plate is normal to the incident beam.

Being a two-wave interferometer, unlike previously-developed FP-based acoustic sensors, the PFM sensor of certain embodiments described herein can be advantageously much less sensitive to the choice of interrogating wavelength. It can easily be shown with Eq. 7 that for a well depth of $\lambda/8$, the wavelength can be detuned from its optimum value over a range of about $\pm\lambda/10$ nm before the sensitivity decreases from its maximum value by 10%. This is a drastic improvement over the limited bandwidth (e.g., ±0.5 nm) of previously-developed FP-based sensors.

The fabricated phase plate compatible with certain embodiments described herein had a measured diaphragm radius of 310 μm, a thickness of 1.1 μm (measured with a scanning electron microscope), and a well depth of about 500 nm (measured with an optical profilometer). This last value is larger than the optimum targeted value ($\lambda/8 \approx 194$ nm for operation at $\lambda = 1550$ nm) because the diaphragm buckled during microfabrication. Because of the residual angular misalignment between the phase plate and the collimated beam, only half of the expected power was coupled back to the fiber, which reduced the displacement sensitivity by a factor of 2.

Using these measured values in the models described herein give a calculated compliance $C_m$ of about 8 nm/Pa, a calculated displacement sensitivity $\sigma \approx 3.45 \times 10^5$ m$^{-1}$ (79% of what it would have been with a well depth of 194 nm). Multiplying these two values by the calculated acoustic response $R_\alpha$ (the only one of these three parameters that depends on acoustic frequency) gives the predicted normalized sensitivity spectrum shown in FIG. 6 (dotted curve; labeled "Calculated"). The sensitivity is uniform between about 100 Hz and about 10 kHz. In this flat band, the normalized sensitivity is $S_N = 2.8 \times 10^{-3}$ Pa$^{-1}$. Note that this value is smaller than that in a previously-developed FP-based sensor (about 0.17 Pa$^{-1}$), mainly because (1) this new sensor is a two-wave interferometer, (2) its diaphragm is both smaller and thicker, and therefore much less compliant (by a factor of about 11), and (3) the well depth (about 500 nm) is larger than the ideal value (e.g., 196 nm) and thus σ is not optimum. The dashed spectrum in FIG. 6 (labeled "Targeted") is the sensitivity that can be expected if all four conditions had been met. The various fabrication errors and misalignments resulted in a factor of about 4.6 reduction in the expected sensitivity.

The normalized sensitivity and noise of the example PFM sensor in accordance with certain embodiments described herein were characterized experimentally in an anechoic chamber using a setup similar to the one described previously (W. Jo, O. C. Akkaya, O. Solgaard, and M. J. F. Digonnet, "Miniature fiber acoustic sensors using a photonic-crystal membrane," Opt. Fiber Technol. 19, 785-792 (2013)). A new acoustic source (FOSTEX FF85WK) with a wide bandwidth (100 Hz-30 kHz) was installed in the chamber to measure the sensor response down to 100 Hz. The signals from both the sensor and a calibrated reference microphone (Brüel & Kjær 4113) were recorded simultaneously using a dynamic signal analyzer (HP 3562A). These signals showed a strong coherence (about 1) over the entire frequency range of measurements (100 Hz to 30 kHz). To measure the sensitivity, the sensor signal was calibrated against the reference signal, then normalized to the input power $P_{in}$.

Figure 6:
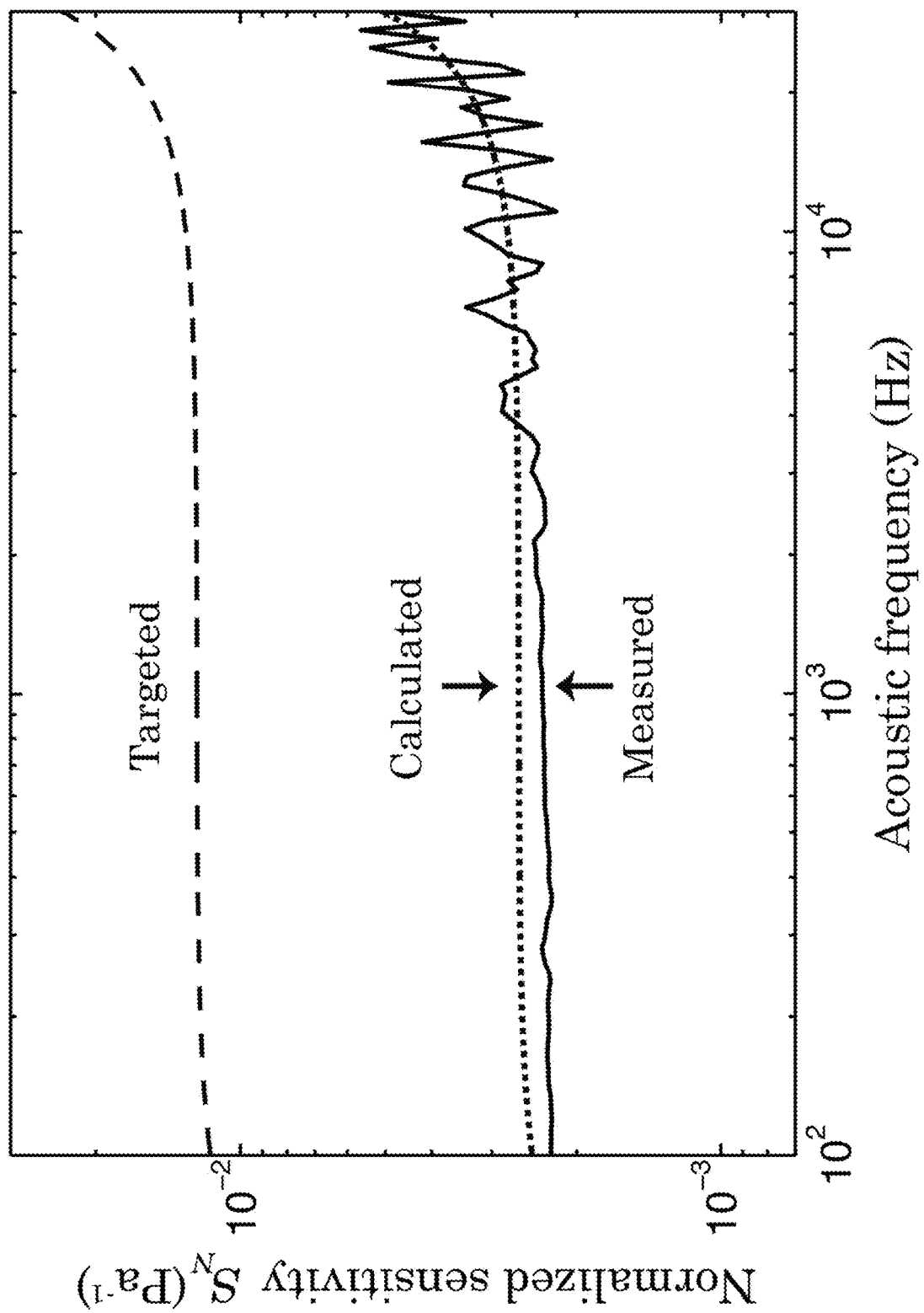
FIG. 6 is a plot of measured and calculated sensitivity spectra for an example PFM sensor in accordance with certain embodiments described herein.

The measured sensitivity spectrum is displayed in FIG. 6 as the solid curve (labeled "Measured"). As predicted by the "Calculated" curve, it is fairly uniform over a broad band extending from 100 Hz to about 10 kHz. The measured sensitivity in the geometric middle of this flat band (1 kHz) is about $2.4 \times 10^{-3}$ $Pa^{-1}$, which is in good agreement with the value predicted for this example PFM sensor in accordance with certain embodiments described herein ("Calculated" curve in FIG. 6). The small sensitivity difference in the flat band is likely due to a slight departure between the actual radius of the beam incident on the diaphragm and the ideal radius (about 630 µm) for this diaphragm radius.

Figure 7:
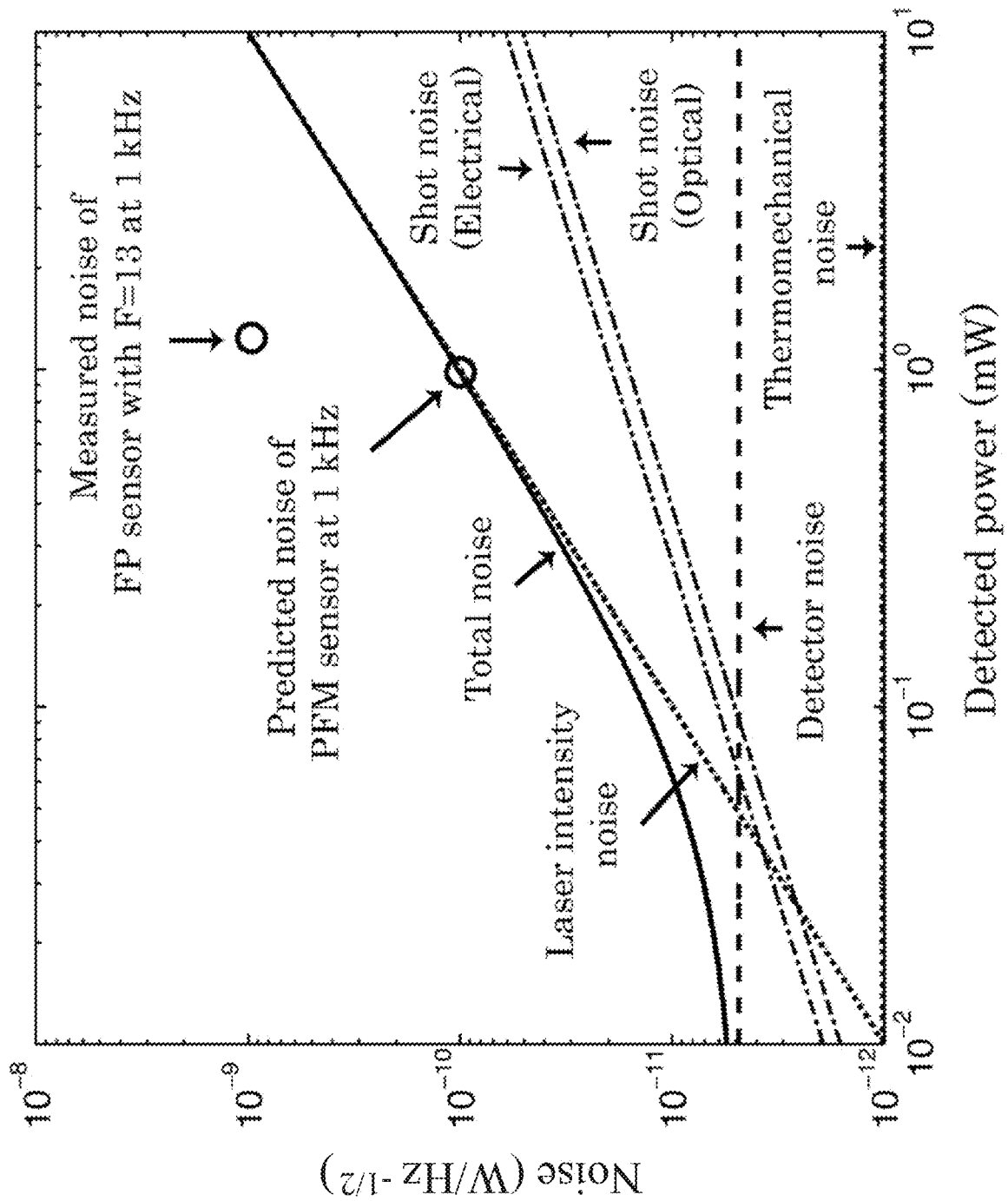
FIG. 7 is a plot of various noise contributions of the example PFM sensor in accordance with certain embodiments described herein.

To find the optimum optical power to achieve the lowest minimum detectable pressure (MDP), the total noise equivalent power of the detected signal was calculated by adding the various noise contributions evaluated at 1 kHz for a detected power $P_{det}$ in the range of 0.01-10 mW (see FIG. 7). The noise equivalent power of the detector (4.9 pW/√Hz) was obtained from the manufacturer's datasheet. The laser intensity noise was calculated from the known RIN (−140 dB/Hz at 1 kHz) of the laser times the detected power. The thermomechanical noise of the diaphragm was calculated using an equivalent electromechanical circuit model reported elsewhere (O. C. Akkaya, M. J. F. Digonnet, G. S. Kino, and O. Solgaard, "Modeling and demonstration of thermally stable high-sensitivity reproducible acoustic sensors," J. Microelectromechanical Syst. 21, 1347-1356 (2012)). FIG. 7 indicates that for detected powers lower than about 20 µW, the total noise is dominated by detector noise. Above about 100 µW, the total noise is dominated by the laser intensity noise, and it increases proportional to the detected power. The shot noise (both optical and electrical) and the thermomechanical noise are negligible at all power levels. The thermomechanical noise is negligible, unlike in the previously-developed FP-based sensor where it dominates, for the same reason that the sensitivity is lower in this example PFM sensor, which is that this example PFM sensor has a much lower finesse since it is a two-wave interferometer.

The MDP $p_{min}$ of the example PFM sensor is, by definition, the pressure that induces an output signal equal to the noise power $P_{noise}$, which can be expressed as:

$$p_{min} = \frac{P_{noise}}{S_N P_{in}} \quad (8)$$

where $P_{in}$ is the laser power incident on the example PFM sensor. This signal $P_{in}$ is proportional to the detected power, and so is the noise power above about 100 µW of detected power. Therefore, at larger detected powers (>0.7 mW), the MDP is independent of detected power and is at its lowest values. Thus, to achieve the lowest MDP, the example PFM sensor was operated at 1 mW of detected power.

At 1 kHz, the calculated sensor noise for the example PFM sensor is about 0.1 nW/√Hz, which is about 10 times lower than the noise reported for the previously-developed FP-based sensor. This is due to the elimination in the example PFM sensor of the thermomechanical noise that dominated in the previously-developed FP-based sensor.

Figure 8:
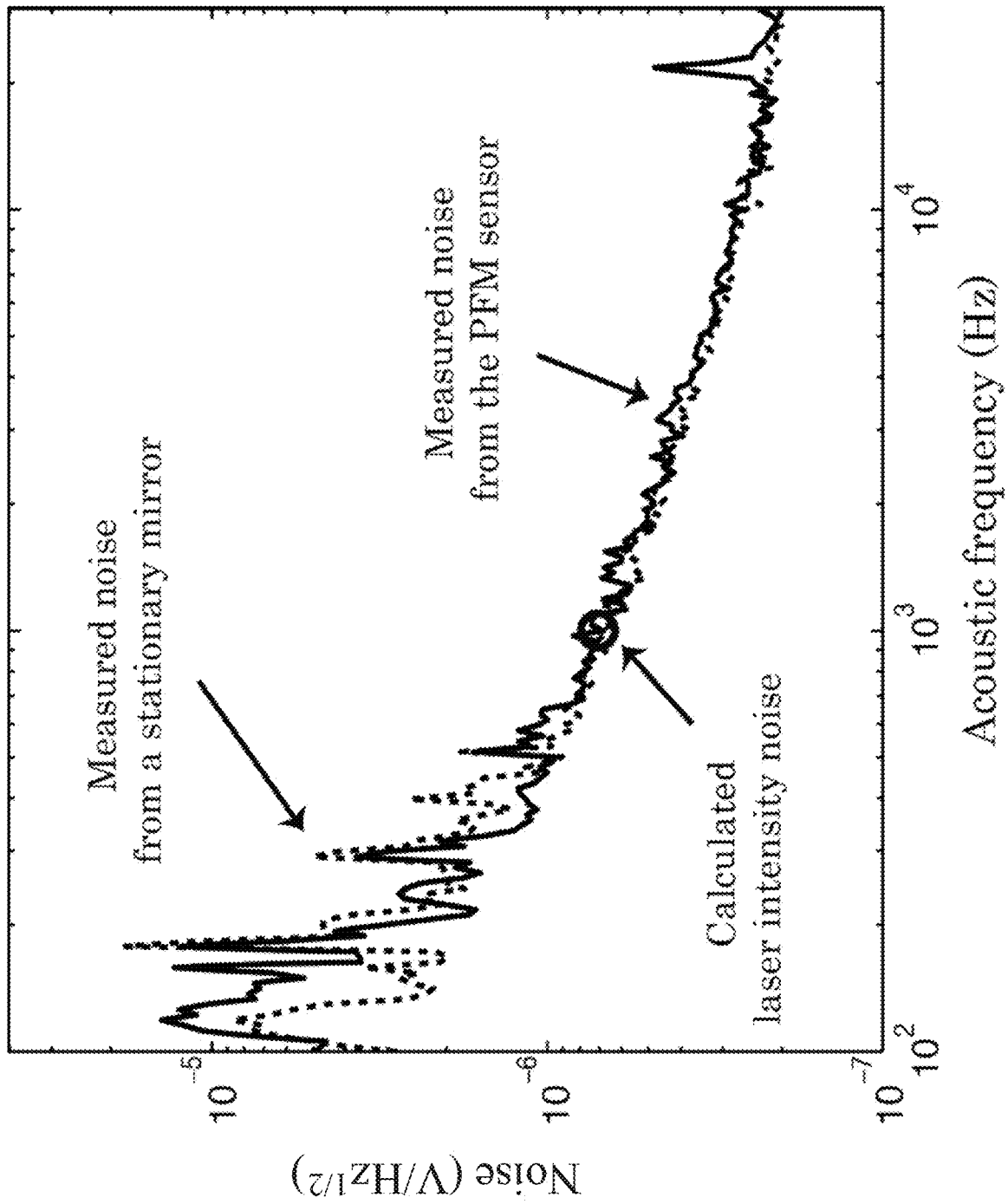
FIG. 8 is a plot of the measured sensor noise spectrum of the example PFM sensor in accordance with certain embodiments described herein.

The noise power spectral density of the example PFM sensor was measured with the acoustic source turned off (solid curve in FIG. 8). At 1 kHz, it is in good agreement with the laser intensity noise provided by the manufacturer (black circle in FIG. 8). To verify that the dominant noise source did not originate from the example PFM sensor, the noise measurement was repeated after replacing the example PFM sensor by a stationary reflector (a dielectric-coated fiber) with the same detected power (1 mW). Because the stationary mirror does not respond to acoustic perturbations, the noise was expected to have the same contributions as the actual example PFM sensor, excluding the thermo-mechanical noise. The measured noise using the stationary mirror is indeed almost identical to the measured sensor noise (see FIG. 8), and both are dominated by laser intensity noise, as expected.

Figure 9:
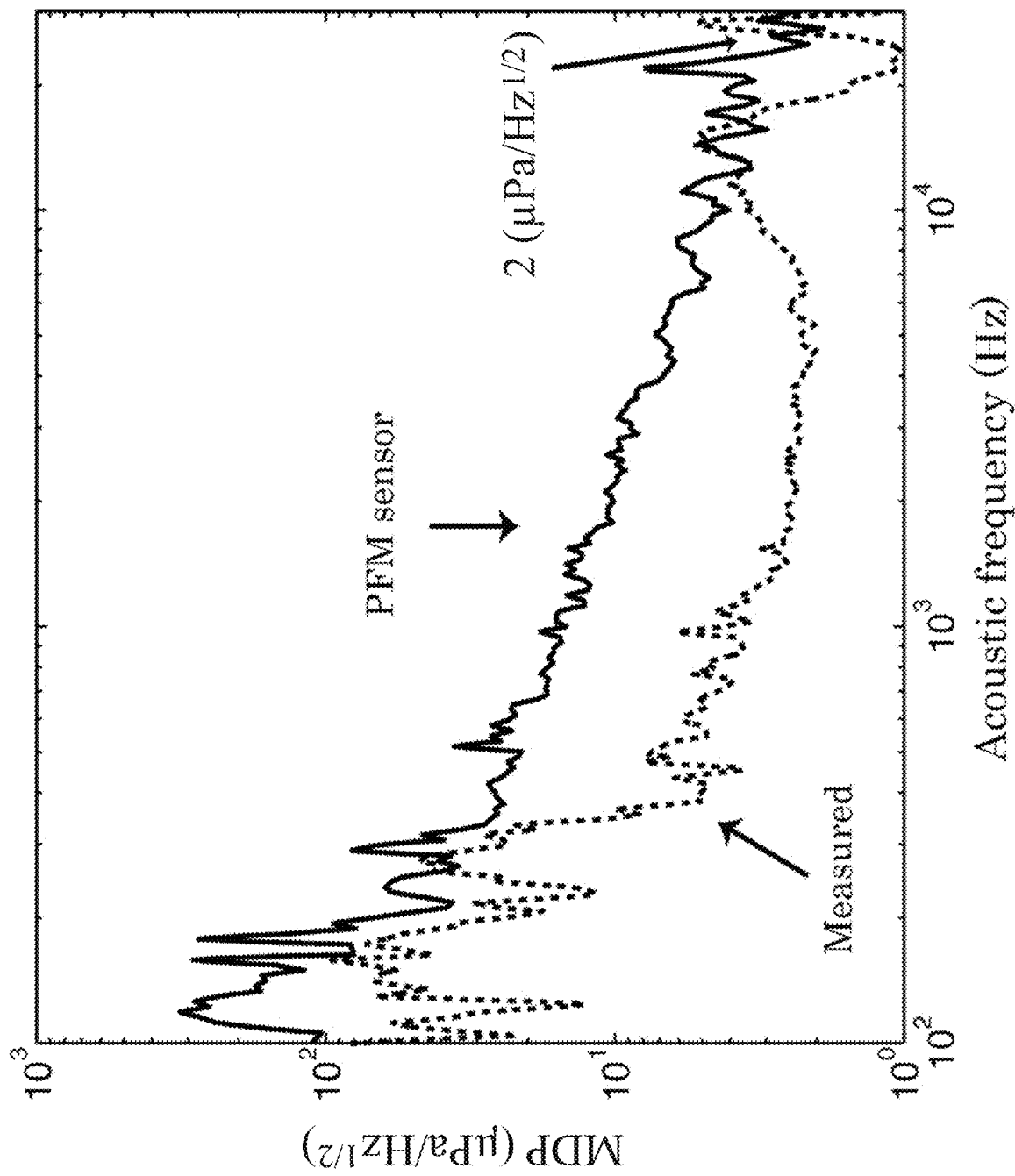
FIG. 9 is a plot of the MDP spectrum of the example PFM sensor in accordance with certain embodiments described herein compared to a measured MDP spectrum of a previously-developed FP-based sensor.

The MDP was calculated by dividing the noise power spectral density by the calibrated sensor response (in V/Pa). FIG. 9 shows that the lowest measured MDP for the example PFM sensor is about 2 µPa√Hz at about 27 kHz, and that the average MDP is about 5.4 µPa√Hz between 1 kHz and 30 kHz. At 1 kHz, the MDP is about 4 times higher than that of the best previously-developed FP-based sensor (about 4 µPa√Hz). This is because in the example PFM sensor the noise is 10 times smaller, the normalized sensitivity about 68 times smaller, and the input power is about 2 times larger. Inserting these values in Equation 2 shows that its MDP was expected to be smaller by a factor of 68/10/2=3.4, which is consistent with the measured factor of about 4.

Near 10 kHz, the MDPs of both sensors are comparable because (1) the example PFM sensor has an even lower noise (by a factor of 2) because the RIN is smaller at high frequencies, and thus the MDP is lower by a factor of 2; and (2) the previously-developed FP-based sensor has a higher thermomechanical noise (by a factor of 2) due to its resonance around that frequency, and thus its MDP is higher by a factor of 2.

The example PFM sensor can be further optimized in a number of straightforward ways to improve its sensitivity and lower its MDP. By reducing the diaphragm thickness from the current value of 1.1 µm to the same thickness as the previously-developed FP-based sensor (e.g., 450 nm), $C_m$ can be increased by a factor of about 14 (since it is inversely proportional to the third power of thickness). Optimizing the depth of the well to the targeted value (e.g., λ/8) can increase the displacement sensitivity by a factor of about 1.3. The reflectivity of the phase plate can also be increased from about 70% to nearly 100%, for example, by writing in it a photonic crystal. These combined improvements are predicted to yield an MDP at 1 kHz of about 0.59 µPa/√Hz, which is lower than the value reported for the best previously-reported FP-based sensor (dotted spectrum in FIG. 9; labeled "Measured"). Note that improving the optical alignment would increase the sensor output signal and hence the normalized sensitivity. However, it would reduce the sensor noise as well, in the same ratio as long as the noise is limited by the laser RIN, and it would therefore not improve the MDP.

As described herein, four conditions can be considered for achieving a maximum sensitivity in accordance with certain embodiments described herein, namely: (1) the well depth is λ/8 (independently of the relative sizes of the diaphragm and incident beam), (2) the diaphragm radius is 64% of the beam radius (which maximizes the product $I_2 I_3$ in Eq. 7), (3) the reflectivity of the phase plate is 100% (which maximizes the amplitude of the reflected field $E_r(r)$ in the integrals of Eqs. 6a-6c), and (4) the phase plate is normal to the incident beam. Conditions (3) and (4) imply that any loss in the optical path will directly affect the sensitivity of the sensor. Thus, assuming the phase plate as having a reflectivity of 100% and that there is little or no loss in the optical path, there are two parameters which determine the maximum sensitivity: well depth and relative diaphragm radius to incident beam size.

Figure 10A:
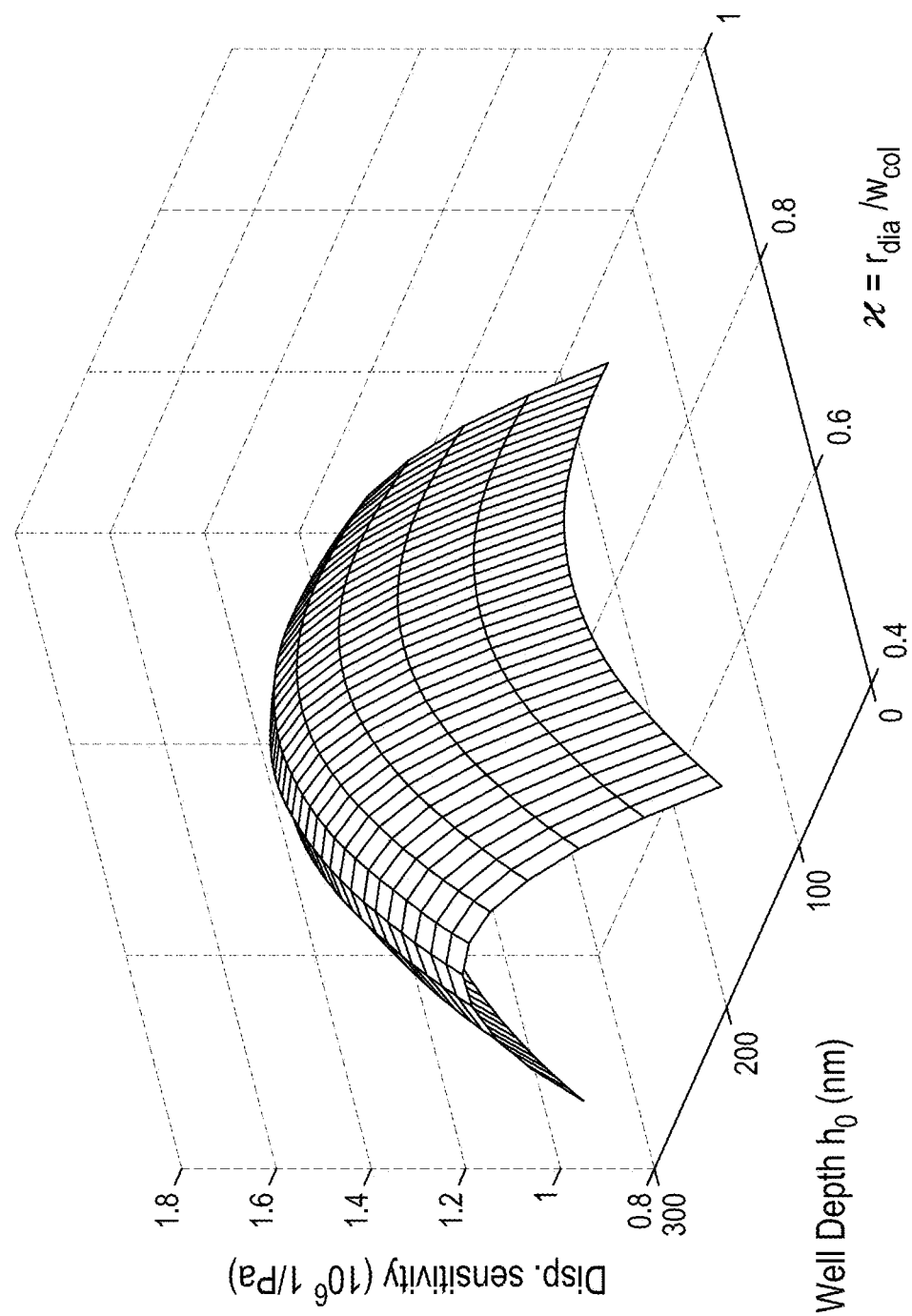
FIG. 10A is a plot of a numerically calculated displacement sensitivity and FIG. 10B is a plot of an analytically calculated displacement sensitivity resulting from varying the well depth $h_0$ and the ratio $\kappa = r_{dia}/w_{col}$, where $r_{dia}$ and $w_{col}$ are the sensor diaphragm radius and the collimated beam waist, respectively, at an operating wavelength of 1550 nm.
Figure 10B:
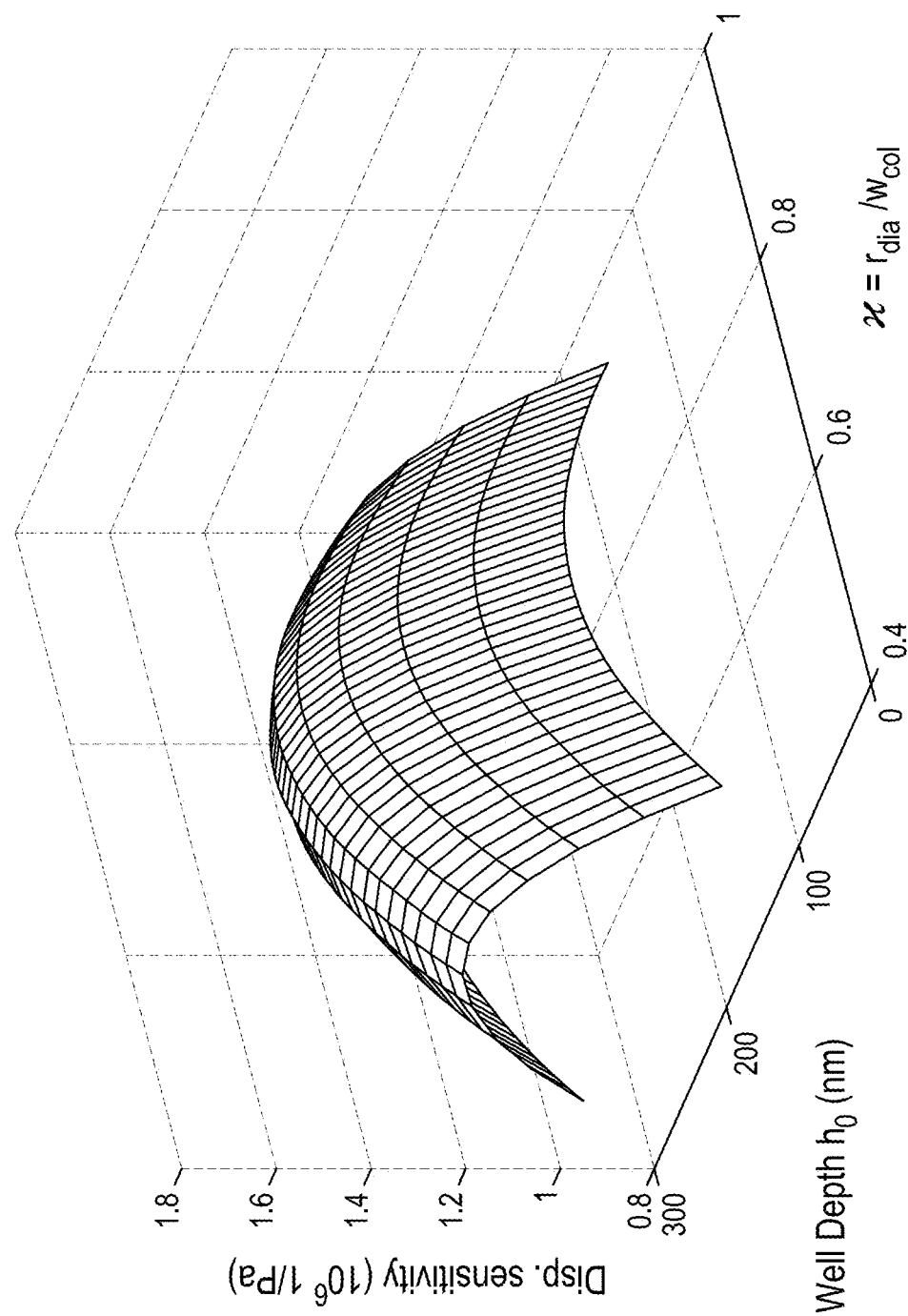
Figure 11A:
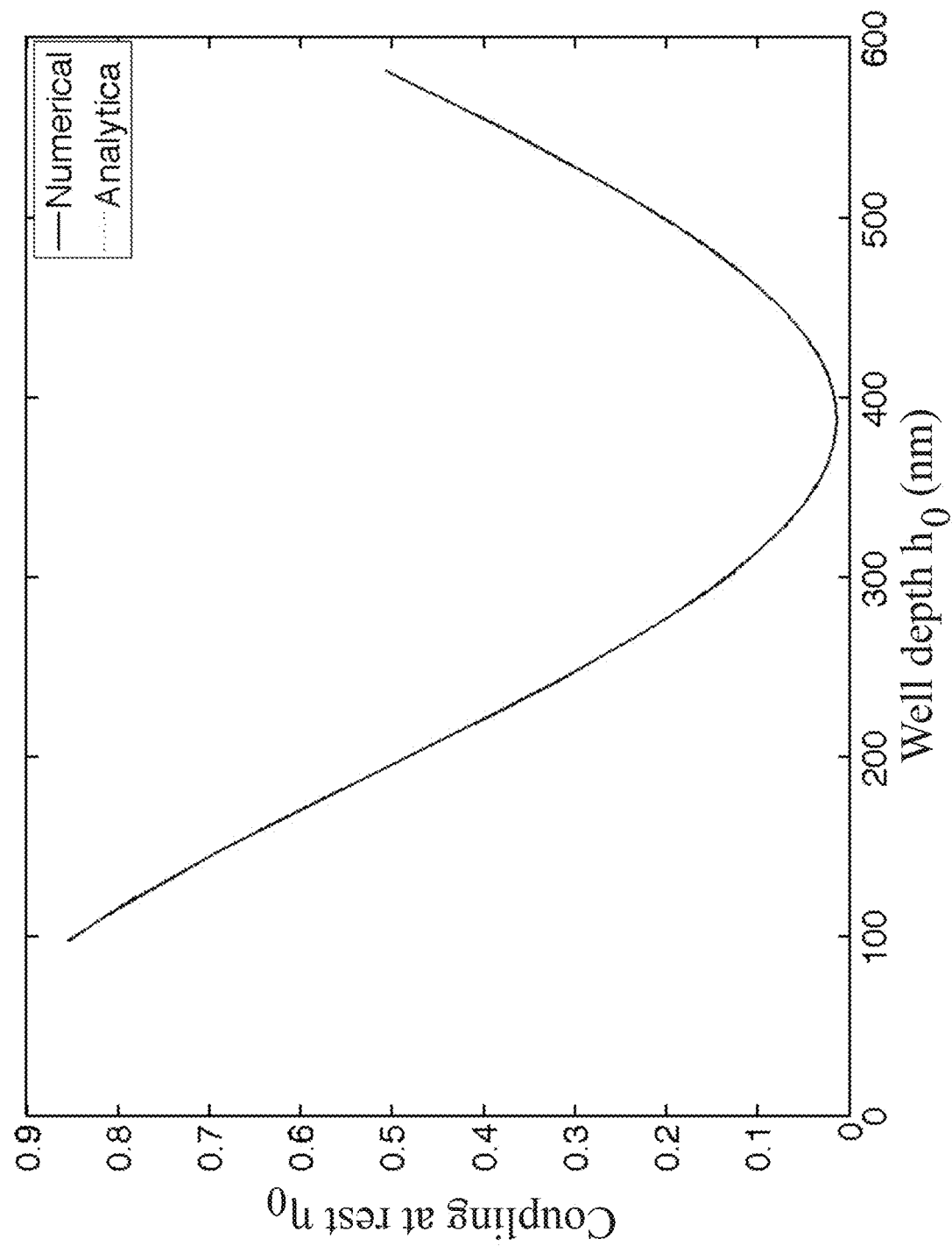
FIG. 11A illustrates the coupling coefficient at a static condition at rest ($\eta_0$) as a function of well depth $h_0$ for a fixed value of $\kappa=0.64$.
Figure 11B:
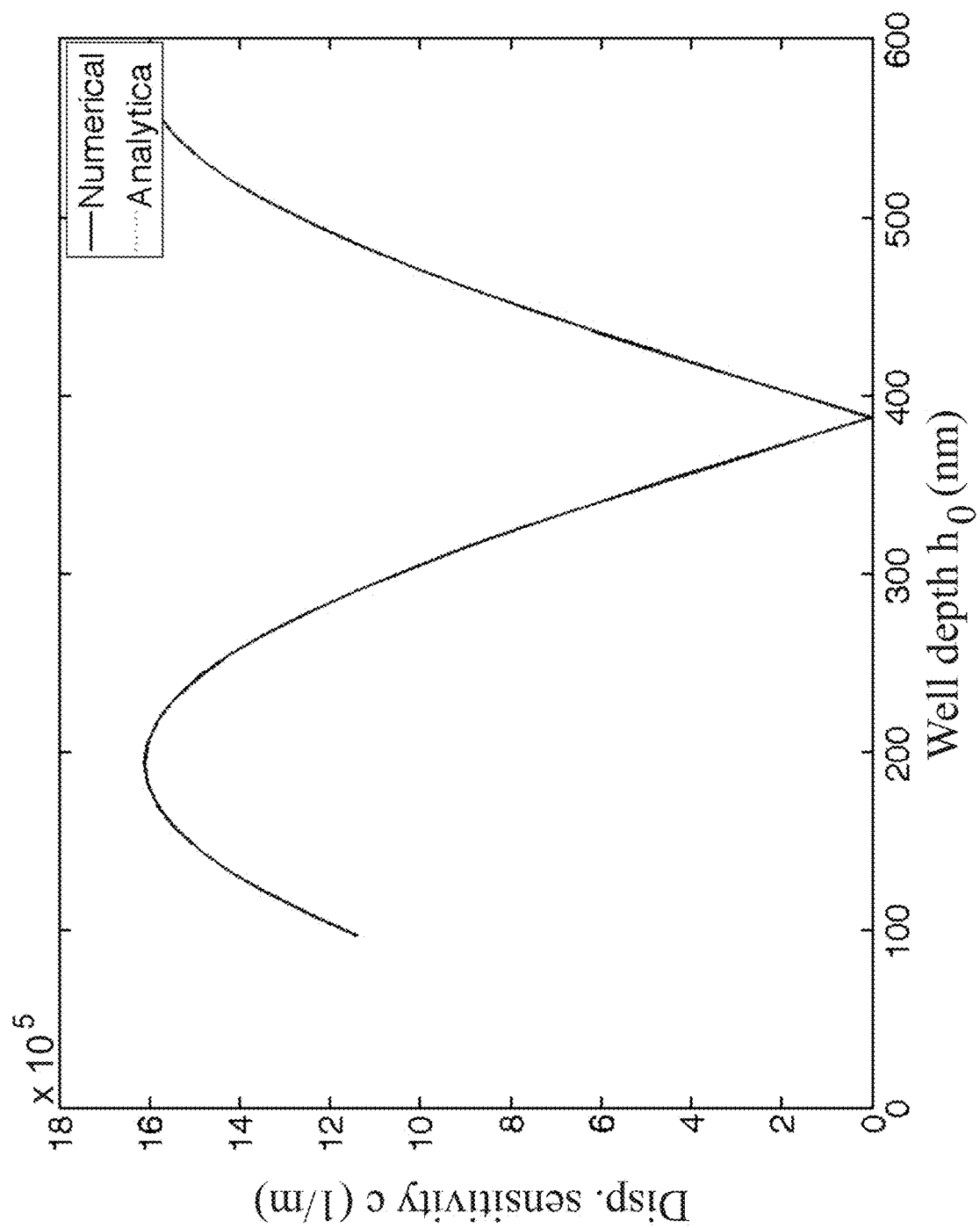
FIG. 11B illustrates the displacement sensitivity $\sigma$ as a function of well depth $h_0$ for a fixed value of $\kappa=0.64$, with the sensitivity going to zero at $h_0=\lambda/4$.
Figure 11C:
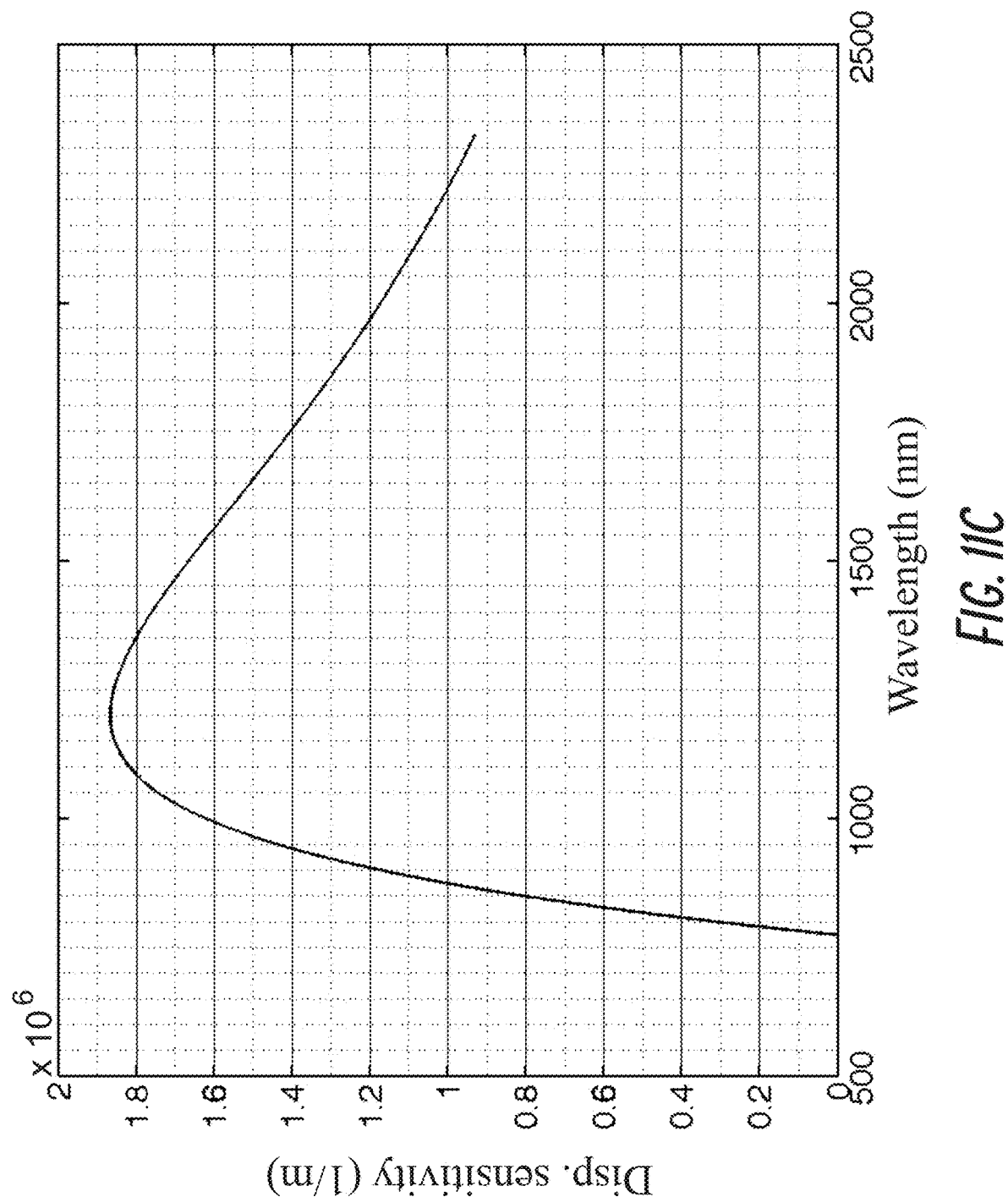
FIG. 11C illustrates the displacement sensitivity $\sigma$ as a function of wavelength $\lambda$ for $h_0=\lambda/8$ and $\kappa=0.64$.

In certain embodiments, the optimum operating condition can be found using numerical calculations or analytical calculations. Using the numerical expression of the coupling efficieny (Eq. 1), the optimum operating point can be found, which gives the maximum displacement sensitivity σ. For example, using an operating wavelength of 1550 nm, there are two variables to calculating σ: the well depth $h_0$ and the ratio $\kappa = r_{dia}/w_{col}$, where $r_{dia}$ and $w_{col}$ are the sensor diaphragm radius and the collimated beam waist, respectively. FIG. 10A is a plot of a numerically calculated displacement sensitivity and FIG. 10B is a plot of an analytically calculated displacement sensitivity resulting from varying these two variables. The maximum value of σ in FIG. 10A (using the numerical calculations) equals $1.6125 \times 10^6$ m$^{-1}$ at $h_0 = 193.74$ nm and $\kappa = 0.64$. The maximum value of σ in FIG. 10B (using the analytical calculations) equals $1.6110 \times 10^6$ m$^{-1}$ at $h_0 = 193.75$ nm and $\kappa = 0.64$. Both analytical and numerical calculations show that the sensitivity is maximum with $h_0 = 193.75$ nm and $\kappa = 0.64$. FIG. 11A illustrates the coupling coefficient at a static condition at rest ($\eta_o$) as a function of well depth $h_0$ for a fixed value of $\kappa = 0.64$. FIG. 11B illustrates the displacement sensitivity σ as a function of well depth $h_0$ for a fixed value of $\kappa = 0.64$, with the sensitivity going to zero at $h_0 = \lambda/4$. FIG. 11C illustrates the displacement sensitivity σ as a function of wavelength λ for $h_0 = \lambda/8$ and $\kappa = 0.64$.

Certain embodiments described herein provide a compact fiber sensor that utilizes for the first time the principle of phase-front modulation to detect acoustic waves at extremely low pressures. In certain embodiments, the sensor can utilize a reflective diaphragm with a π/2 phase step microfabricated in a silicon wafer, combined with a single-mode fiber acting as a spatial filter, to form a simple interferometric sensor head. In certain embodiments, the sensor can present several advantages over state-of-the-art, high-sensitivity, diaphragm-based, fiber Fabry-Perot sensors. As a two-wave interferometer, for the same diaphragm dimensions and reflectivity, it can be less sensitive, but its noise can be also lower in the same ratio, so that its minimum detectable strain (or strain resolution) is nominally the same. Also, because it is a two-wave interferometer, its sensitivity can depend very weakly on the operating wavelength: the latter can be changed by ±λ/10 for the sensitivity to decrease by ±10%. Unlike previously-developed FP-based fiber acoustic sensors, in certain embodiments, the operating wavelength can be set during the microfabrication instead of during assembly, and it is therefore much more reproducible, in addition of being much less critical. Finally, in certain embodiments, it is much easier and faster to fabricate the sensor head in the clean room and to assemble the sensor.

As described above, a simple analytical expression can be used for the sensitivity of this sensor to acoustic pressure. A laboratory prototype of an example sensor in accordance with certain embodiments described herein was fabricated and analyzed to have an average minimum detectable pressure as low as 5.4 µPa/√Hz between 1 kHz and 30 kHz, in agreement with a theoretical model. Straightforward improvements can be made to improve this figure down to the 0.2 µPa/√Hz level. In certain embodiments, the sensor has a great potential in various areas, including in vivo pressure monitoring, surveillance, seismic research, structural health monitoring, photoacoustic imaging, stem cell research, and in sensor array networks for oil and gas exploration.

Various embodiments have been described above. Although this invention has been described with reference to these specific embodiments, the descriptions are intended to be illustrative and are not intended to be limiting. Various modifications and applications may occur to those skilled in the art without departing from the true spirit and scope of the invention as defined in the claims.

What is claimed is:

1. A sensor comprising:
   at least one optical waveguide configured to emit light in a direction; and
   an optical reflector optically coupled to the at least one optical waveguide, the optical reflector configured to reflect at least a portion of the light, the optical reflector comprising:
      a first portion of the optical reflector configured to reflect a first portion of the light back to the at least one optical waveguide; and
      a second portion of the optical reflector configured to reflect a second portion of the light back to the at least one optical waveguide, the second portion of the optical reflector responsive to a perturbation by moving relative to the first portion of the optical reflector, the reflected second portion of the light differing in phase from the reflected first portion of the light by a phase difference that is not substantially equal to an integer multiple of π when the second portion of the optical reflector is in an equilibrium position in absence of the perturbation.

2. The sensor of claim 1, wherein the at least one optical waveguide comprises an optical fiber.

3. The sensor of claim 2, wherein the at least one optical waveguide further comprises at least one lens configured to receive the light from the optical fiber and to transmit the light towards the optical reflector.

4. The sensor of claim 3, wherein the at least one lens comprises a graded-index lens.

5. The sensor of claim 3, wherein the at least one lens is configured to collimate the light emitted from the optical fiber and to return the reflected first portion of the light and the reflected second portion of the light to the optical fiber.

6. The sensor of claim 1, further comprising a laser configured to generate the light, the light having at least one wavelength, the sensor further comprising an optical signal analyzer configured to receive the reflected first portion of the light and the reflected second portion of the light from the at least one optical waveguide.

7. A sensor comprising:
   at least one optical waveguide configured to emit light in a direction; and
   an optical reflector optically coupled to the at least one optical waveguide, the optical reflector configured to reflect at least a portion of the light, the optical reflector comprising:

a first portion of the optical reflector configured to reflect a first portion of the light back to the at least one optical waveguide; and a second portion of the optical reflector configured to reflect a second portion of the light back to the at least one optical waveguide, the second portion of the optical reflector responsive to a perturbation by moving relative to the first portion of the optical reflector, the reflected second portion of the light differing in phase from the reflected first portion of the light by a phase difference that is not substantially equal to an integer multiple of $\pi$ when the second portion of the optical reflector is in an equilibrium position in absence of the perturbation, wherein the optical reflector comprises a wafer, the first portion of the optical reflector comprising a first surface of the wafer, the second portion of the optical reflector comprising a diaphragm offset from the first portion of the optical reflector along the direction, the diaphragm in a well surrounded by the first surface.

8. The sensor of claim 7, wherein the diaphragm is thinner than portions of the wafer surrounding the diaphragm.

9. The sensor of claim 7, wherein the diaphragm is elastically deformable in response to the perturbation.

10. The sensor of claim 7, wherein the light has a wavelength and the well has a depth substantially equal to one-eighth of the wavelength.

11. The sensor of claim 7, wherein the light has a width greater than a width of the well.

12. The sensor of claim 7, wherein the light has a width less than or equal to a width of the well.

13. The sensor of claim 7, wherein the optical reflector comprises a plurality of spring structures mechanically coupled to the first portion of the optical reflector and to the diaphragm, the plurality of spring structures configured to elastically stretch and move such that the diaphragm translates in a direction that is generally perpendicular to the diaphragm.

14. The sensor of claim 7, wherein the diaphragm is mechanically coupled to the wafer along a perimeter of the diaphragm, and the diaphragm is configured to elastically bow back and forth in a direction that is generally perpendicular to the diaphragm.

15. The sensor of claim 1, wherein the phase difference is substantially equal to an odd integer multiple of $\pi/2$.

16. The sensor of claim 1, wherein the phase difference has a magnitude that is in at least one of the following ranges: substantially greater than zero and substantially less than $\pi$, substantially greater than $\pi$ and substantially less than $2\pi$, substantially greater than $2\pi$ and substantially less than $3\pi$, substantially greater than zero and less than or equal to $\pi/2$, greater than or equal to $\pi/2$ and substantially less than $\pi$, substantially greater than $\pi$ and less than or equal to $3\pi/2$, greater than or equal to $3\pi/2$ and substantially less than $2\pi$, substantially greater than $2\pi$ and less than or equal to $5\pi/2$, and greater than or equal to $5\pi/2$ and substantially less than $3\pi$.

17. A sensor comprising:
at least one optical waveguide configured to emit light in a direction; and
an optical reflector optically coupled to the at least one optical waveguide, the optical reflector configured to reflect at least a portion of the light, the optical reflector comprising:
a first portion of the optical reflector configured to reflect a first portion of the light back to the at least one optical waveguide; and
a second portion of the optical reflector configured to reflect a second portion of the light back to the at least one optical waveguide, the second portion of the optical reflector responsive to a perturbation by moving relative to the first portion of the optical reflector, the reflected second portion of the light differing in phase from the reflected first portion of the light by a phase difference that is not substantially equal to an integer multiple of $\pi$ when the second portion of the optical reflector is in an equilibrium position in absence of the perturbation, wherein the optical reflector is a wafer.

18. The sensor of claim 17, wherein the wafer comprises a semiconductor material.

19. The sensor of claim 17, wherein the wafer comprises a metal layer.

20. The sensor of claim 17, wherein the wafer comprises at least one of the following materials: silicon, silicon nitride, silicon carbide, graphene.

21. The sensor of claim 17, wherein the wafer comprises a photonic crystal structure.

* * * * *